US012757249B2

(12) United States Patent
Xu et al.

(10) Patent No.: US 12,757,249 B2
(45) Date of Patent: Oct. 6, 2026

(54) COMMUNICATION METHOD AND APPARATUS

(71) Applicant: HUAWEI TECHNOLOGIES CO., LTD., Shenzhen (CN)

(72) Inventors: Xiuqiang Xu, Shanghai (CN); Yiqun Wu, Shanghai (CN); Yan Chen, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 593 days.

(21) Appl. No.: 18/175,103

(22) Filed: Feb. 27, 2023

(65) Prior Publication Data

US 2023/0217495 A1 Jul. 6, 2023

Related U.S. Application Data

(63) Continuation of application No. PCT/CN2020/112219, filed on Aug. 28, 2020.

(51) Int. Cl.
*H04W 74/08* (2024.01)
*H04W 74/0816* (2024.01)

(52) U.S. Cl.
CPC ... *H04W 74/0816* (2013.01); *H04W 74/0875* (2013.01)

(58) Field of Classification Search
CPC ......... H04W 52/0235; H04W 74/0816; H04W 74/0875; H04W 88/04; H04B 7/155
See application file for complete search history.

(56) References Cited

U.S. PATENT DOCUMENTS

| | | | | |
|---|---|---|---|---|
| 11,082,809 B1 * | 8/2021 | Burowski | ............. | H04W 8/005 |
| 2006/0240799 A1 * | 10/2006 | Kim | ..................... | H04B 1/1615 455/343.2 |
| 2008/0045145 A1 * | 2/2008 | Nakatsugawa | ........ | H04B 7/155 455/11.1 |
| 2010/0130193 A1 | 5/2010 | Li et al. | | |

(Continued)

FOREIGN PATENT DOCUMENTS

| | | |
|---|---|---|
| CN | 102685780 A | 9/2012 |
| CN | 103916879 A | 7/2014 |

(Continued)

OTHER PUBLICATIONS

Huawei (Rapporteur), Running 36.300 CR to capture agreements on NB-IoT. 3GPP TSG-RAN WG2 Meeting #92 , Anaheim , USA, Nov. 16-20, 2015, R2-157187, 18 pages.

(Continued)

*Primary Examiner* — Liton Miah

(74) *Attorney, Agent, or Firm* — HAUPTMAN HAM, LLP

(57) ABSTRACT

This application relates to the field of wireless communication technologies, and discloses a communication method and an apparatus, to reduce power consumption caused by invalid listening of a terminal. First, a first device sends a first message to a second device, and the second device may send the first message from the first device to a third device. Then, the first device listens to a response message of the first message from the third device in a listening time window. The response message of the first message may be sent by the third device to the first device, or may be sent by the third device to the first device via the second device.

14 Claims, 9 Drawing Sheets

(56) References Cited

U.S. PATENT DOCUMENTS

| | | | | |
|---|---|---|---|---|
| 2016/0174257 | A1 | 6/2016 | Webb | |
| 2016/0174263 | A1 | 6/2016 | Webb | |
| 2017/0048904 | A1* | 2/2017 | Monaghan | H04W 76/14 |
| 2020/0245227 | A1 | 7/2020 | Tao | |
| 2021/0072373 | A1* | 3/2021 | Schoenberg | G01S 13/878 |
| 2021/0081021 | A1* | 3/2021 | Yu | G06F 1/3209 |

FOREIGN PATENT DOCUMENTS

| | | | |
|---|---|---|---|
| CN | 107223353 | A | 9/2017 |
| CN | 108476480 | A | 8/2018 |
| CN | 110831027 | A | 2/2020 |
| CN | 111200866 | A | 5/2020 |
| EP | 3761716 | A1 | 1/2021 |
| WO | 2019227998 | A1 | 12/2019 |

OTHER PUBLICATIONS

Extended European Search Report issued in corresponding European Application No. 20950808.4, dated Sep. 11, 2023, pp. 1-6.
Chinese First Office Action issued in corresponding Chinese Patent Application No. 202080103469.1, dated Jan. 31, 2024, pp. 1-15.
European Office Action issued in EP20950808.4 dated Aug. 28, 2025.

* cited by examiner

COMMUNICATION METHOD AND APPARATUS

CROSS-REFERENCE TO RELATED APPLICATIONS

This application is a continuation of International Application No. PCT/CN2020/112219, filed on Aug. 28, 2020, the disclosure of which is hereby incorporated by reference in its entirety.

TECHNICAL FIELD

Embodiments of this application relate to the field of wireless communication technologies, and in particular, to a communication method and an apparatus.

BACKGROUND

When a large quantity of terminals directly access a network or send data through an air interface, network congestion is prone to occur, reducing an access success rate or a data transmission success rate. A relay (relay) technology can improve data transmission reliability or reduce air interface collisions.

A relay device may aggregate data or request information of a plurality of terminals for forwarding. For example, the relay device receives access requests of the plurality of terminals, and accesses a network in a cluster (cluster) or group (group) manner, to reduce a quantity of access times for an air interface, that is, to reduce the air interface collisions. For another example, after receiving data packets of the plurality of terminals, the relay device aggregates the plurality of received data packets sent by the plurality of terminals (for example, aggregate the plurality of data packets together for channel coding), and then forwards the plurality of aggregated data packets to a network device. In this way, a quantity of air interface data transmission times can be reduced, thereby reducing demodulation reference signal (deModulation reference signal, DMRS) collisions.

The relay device does not immediately forward the access request or the data sent by the terminal to the network device each time after receiving the access request or the data sent by the terminal. Instead, the relay device waits for an access request or data of another member, and packs the plurality of access requests or the data of the plurality of terminals for forwarding. If the terminal immediately starts to listen to a response message from the network device (where the response message may be directly from the network device, or may be sent by the network device to the terminal via forwarding of the relay device) after sending the access request or the data to the relay device. This results in invalid listening, and increases power consumption of the terminal.

Based on this, how to reduce power consumption of the terminal is a technical problem to be resolved.

SUMMARY

Embodiments of this application provide a communication method and an apparatus, to reduce power consumption caused by invalid listening of a terminal.

According to a first aspect, a communication method is provided. The method may be applied to a communication system including a first device, a second device, and a third device. The first device sends a message to the second device, and the second device sends the message from the first device to the third device. The third device may directly send a response to the first device, or the third device sends a response to the first device via the second device. The method is applied to the first device or a chip in the first device. First, the first device may send a first message to the second device. Then, the first device may start to listen to a response message of the first message from the third device at a start point of a listening time window. The listening time window is used by the first device to listen to the response message of the first message from the third device. The response message of the first message may be sent by the third device to the first device, or may be sent by the third device to the first device via the second device.

In this embodiment, the first device determines the start point of the listening time window, starts to listen to the response message at the start point of the listening time window, and does not listen to the response message before the start point of the listening time window arrives. In this manner of determining the listening time window, the first device does not perform listening too early. Therefore, power consumption of the first device is reduced.

In a possible implementation, the first device receives a second message from the second device, where the second message indicates the start point of the listening time window. In this embodiment, the second device indicates the start point of the listening time window.

In a possible implementation, the first device determines the start point of the listening time window based on a first resource used to send the first message. In this embodiment, a sending resource of the first device is associated with the start point of the listening time window, and the listening time window is determined based on the sending resource of the first device.

In a possible implementation, the first device determines the start point based on a second resource associated with a first resource used by the first device to send the first message. The second resource is used by the second device to send the first message to the third device. In this embodiment, a sending resource of the first device is associated with a sending resource of the second device, and the sending resource of the second device is associated with the start point of the listening time window. An associated sending resource of the second device is determined based on the sending resource of the first device, and then the start point of the listening time window is determined based on the sending resource of the second device.

In a possible implementation, the first device may further receive an association relationship that is between the first resource and the second resource and that is configured by the second device or the third device.

In a possible implementation, when the first device determines the start point based on the first resource used to send the first message, the first device may determine the start point based on a time domain offset and the first resource.

In a possible implementation, the first device may further receive the time domain offset configured by the second device or the third device.

In a possible implementation, the first device may further send priority indication information to the second device, where the priority indication information indicates a priority of the first message. The first message bears service-related information, and the priority indication information may alternatively indicate a priority of a service borne by the first message. The priority of the first message is explicitly indicated by using the indication information. The priority indication information may be carried in control information. The control information may be, for example, sidelink control information (sidelink control information, SCI). The priority indication information may alternatively be carried in data, for example, carried in a media access control (media access control, MAC) control element (control element, CE).

In a possible implementation, the first device may send the first message to the second device on the first resource. The first resource may indicate a priority of the first message. In other words, the first device may send the first message on the first resource corresponding to the priority of the first message. Different sending resources in the first device are corresponding to different priorities. The first resource may include resources such as a time domain resource, a frequency domain resource, and a code domain resource. The priority is implicitly indicated by using the sending resource.

In a possible implementation, when a priority of the first message is higher than or equal to a specified priority, or when a priority identifier of the first message is a high priority, the first device may start to listen to the response message of the first message from the third device at the start point of the listening time window. It may also be understood that before the first device starts to listen to the response message of the first message from the third device at the start point of the listening time window, the first device may first determine that the priority of the first message is higher than or equal to the specified priority, or the first device determines that the priority identifier of the first message is the high priority. That is, the first device starts to listen to the response message of the first message at the start point of the listening time window only when the priority of the first message is high.

According to a second aspect, a communication method is provided. The method is applied to a second device or a chip in the second device. First, the second device may receive a first message from a first device. Then, the first device may send a second message to the second device. The second message indicates a start point of a listening time window, and the listening time window is used by the first device to listen to a response message of the first message from a third device. The second device sends the first message to the third device. A sequence in which the second device sends the first message to the third device and the second device sends the second message to the first device is not limited.

In this embodiment, the second device indicates the start point of the listening time window to the first device. The first device starts to listen to the response message at the start point of the listening time window, and does not listen to the response message before the start point of the listening time window arrives. In this manner of determining the listening time window, the first device does not perform listening too early. Therefore, power consumption of the first device is reduced.

In a possible implementation, the second message may indicate a time domain offset (offset) and/or a reference point, the time domain offset (offset) is for determining the start point of the listening time window, and the reference point is for determining the start point of the listening time window.

In a possible implementation, the second device may further receive priority indication information from the first device, where the priority indication information indicates a priority of the first message. The first message bears service-related information, and the priority indication information may alternatively indicate a priority of a service borne by the first message. The priority of the first message is explicitly indicated by using the indication information. The priority indication information may be carried in control information. The control information may be, for example, sidelink control information (sidelink control information, SCI). The priority indication information may alternatively be carried in data, for example, carried in a media access control (media access control, MAC) control element (control element, CE).

In a possible implementation, the second device may receive the first message from the first device on a first resource. The first resource may indicate a priority of the first message. In other words, the first device may send the first message on the first resource corresponding to the priority of the first message. Different sending resources in the first device are corresponding to different priorities. The first resource may include resources such as a time domain resource, a frequency domain resource, and a code domain resource. The priority is implicitly indicated by using the sending resource.

According to a third aspect, a communication method is provided. The method is applied to a first device or a chip in the first device. First, the first device may send a first message to a second device. Then, the first device may listen to a response message of the first message from a third device in a first period. The first period is pre-configured, and the first period is used by the first device to listen to the response message of the first message from the third device. One or more first periods may be pre-configured. The first period used to listen to the response message herein may be the first period after the first message is sent. The response message of the first message may be sent by the third device to the first device, or may be sent by the third device to the first device via the second device.

In this embodiment, the first period used to listen to the response message is pre-configured. The first device listens to the response message only in the first period, and does not listen to the response message before the first period arrives or at a time point other than the first period. In this manner of pre-configuring the first period used to listen to the response message, the first device does not perform listening too early. Therefore, power consumption of the first device is reduced.

In a possible implementation, the first device may receive a second message from the second device, where the second message may include a first indication. The first indication may indicate the first device to listen to the response message of the first message from the third device in the first period. Further, the first device listens to the response message of the first message from the third device in the next first period.

In this embodiment, the first device listens to the response message in the first period only when the second device indicates the first device to perform listening in the first period, and the first device does not listen to the response message before the second device indicates the first device to perform listening or when the second device indicates the first device not to perform listening. In this manner of listening to the response message based on the indication of the second device, the first device does not perform listening too early. Therefore, the power consumption of the first device is further reduced.

In a possible implementation, the first indication may be one or more of the following: ACK acknowledgment information, indication information of the one or more first periods, and information indicating whether to perform listening. The ACK acknowledgment information may indicate that the second device receives the first message sent by the first device. In this case, the first device may listen to the response message of the first message from the third device in the first period. The indication information of the one or more first periods may indicate that the first device listens to the response message of the first message from the third device within the one or more first periods. The information indicating whether to perform listening may occupy one or more bits. When the one or more bits indicate to perform listening, the first device listens to the response message of the first message from the third device in the first period.

In a possible implementation, the first device may further send priority indication information to the second device, where the priority indication information indicates a priority of the first message. The first message bears service-related information, and the priority indication information may alternatively indicate a priority of a service borne by the first message. The priority of the first message is explicitly indicated by using the indication information. The priority indication information may be carried in control information. The control information may be, for example, sidelink control information (side link control information, SCI). The priority indication information may alternatively be carried in data, for example, carried in a media access control (media access control, MAC) control element (control element, CE).

In a possible implementation, the first device may send the first message to the second device on a first resource. The first resource may indicate a priority of the first message. In other words, the first device may send the first message on the first resource corresponding to the priority of the first message. Different sending resources in the first device are corresponding to different priorities. The first resource may include resources such as a time domain resource, a frequency domain resource, and a code domain resource. The priority is implicitly indicated by using the sending resource.

In a possible implementation, when the priority of the first message is lower than or equal to a specified priority, or when a priority identifier of the first message is a low priority, the first device may listen to the response message of the first message from the third device in the first period. It may also be understood that before the first device listens to the response message of the first message from the third device in the first period, the first device may first determine that the priority of the first message is lower than or equal to the specified priority, or the first device determines that the priority identifier of the first message is the low priority. That is, the first device listens to the response message of the first message in the pre-configured first period only when the priority of the first message is low.

In a possible implementation, the first device receives, from the second device or the third device, a message used to configure the first period. For example, the first device receives the first period configured by the third device using radio resource control (radio resource control, RRC) signaling, a MAC CE, or physical control information (downlink control information, DCI). For another example, the first device receives the first period configured by the second device using RRC signaling, a MAC CE, DCI, or SCI.

According to a fourth aspect, a communication method is provided. The method is applied to a second device or a chip in the second device. The second device sends (configures) information about a first period to (for) a first device. The first period is used by the first device to listen to a response message of a first message from a third device. The first message is sent by the first device to the second device, and then the second device sends the first message to the third device. The response message of the first message may be sent by the third device to the first device, or may be sent by the third device to the first device via the second device.

In this embodiment, the first period used to listen to the response message is pre-configured. The first device listens to the response message only in the first period, and does not listen to the response message before the first period arrives or at a time point other than the first period. In this manner of pre-configuring the period used to listen to the response, the first device does not perform listening too early. Therefore, power consumption of the first device is reduced.

In a possible implementation, the second device may send a second message to the first device after receiving the first message from the first device. The second message includes a first indication. The first indication may indicate the first device to listen to the response message of the first message from the third device in the first period. A sequence in which the second device sends the first message to the third device and the second device sends the second message to the first device is not limited.

In this embodiment, the first device listens to the response message in the first period only when the second device indicates the first device to perform listening in the first period, and the first device does not listen to the response message before the second device indicates the first device to perform listening or when the second device indicates the first device not to perform listening. In this manner of listening to the response message based on the indication of the second device, the first device does not perform listening too early. Therefore, the power consumption of the first device is further reduced.

In a possible implementation, the first indication may be one or more of the following: ACK acknowledgment information, indication information of one or more first periods, and information indicating whether to perform listening. The ACK acknowledgment information may indicate that the second device receives the first message sent by the first device. In this case, the first device may listen to the response message of the first message from the third device in the first period. The indication information of the one or more first periods may indicate that the first device listens to the response message of the first message from the third device within the one or more first periods. The information indicating whether to perform listening may occupy one or more bits. When the one or more bits indicate to perform listening, the first device listens to the response message of the first message from the third device in the first period.

In a possible implementation, the second device sends (configures) the first period to (for) the first device using RRC signaling, a MAC CE, DCI, or SCI.

In a possible implementation, the second device may further receive priority indication information from the first device, where the priority indication information indicates a priority of the first message. The first message bears service-related information, and the priority indication information may alternatively indicate a priority of a service borne by the first message. The priority of the first message is explicitly indicated by using the indication information. The priority indication information may be carried in control information. The control information may be, for example, sidelink control information (side link control information, SCI). The priority indication information may alternatively be carried in data, for example, carried in a media access control (media access control, MAC) control element (control element, CE).

In a possible implementation, the second device may receive the first message from the first device on a first resource. The first resource may indicate a priority of the first message. In other words, the second device may receive the first message on the first resource corresponding to the priority of the first message. Different sending resources in the first device are corresponding to different priorities. The first resource may include resources such as a time domain resource, a frequency domain resource, and a code domain resource. The priority is implicitly indicated by using the sending resource.

According to a fifth aspect, a communication method is provided. The method is applied to a first device or a chip in the first device. First, the first device may send a first message to a second device. Then, the first device may determine, based on a priority of the first message, whether to listen to indication information from the second device before a first period (a base station response period) arrives. The indication information may indicate time information for listening to a response message of the first message from a third device. When determining to listen to the indication information from the second device before the first period (the base station response period) arrives, the first device may listen to the indication information from the second device before the first period arrives. When determining that it is not necessary to listen to the indication information from the second device before the first period (the base station response period) arrives, the first device may listen to the response message of the first message from the third device in the first period (the base station response period). The first period is pre-configured, and the first period is used by the first device to listen to the response message of the first message from the third device.

Based on the priority of the first message, an occasion for listening to the response message of the first message is flexibly selected, so that efficiency of forwarding a message by the second device to the third device and a delay of sending a message by the first device can be balanced.

In a possible implementation, the first device may further send priority indication information to the second device, where the priority indication information indicates the priority of the first message. The first message bears service-related information, and the priority indication information may alternatively indicate a priority of a service borne by the first message. The priority of the first message is explicitly indicated by using the indication information. The priority indication information may be carried in control information. The control information may be, for example, sidelink control information (side link control information, SCI). The priority indication information may alternatively be carried in data, for example, carried in a media access control (media access control, MAC) control element (control element, CE).

In a possible implementation, the first device may send the first message to the second device on a first resource. The first resource may indicate the priority of the first message. In other words, the first device may send the first message on the first resource corresponding to the priority of the first message. Different sending resources in the first device are corresponding to different priorities. The first resource may include resources such as a time domain resource, a frequency domain resource, and a code domain resource. The priority is implicitly indicated by using the sending resource.

In a possible implementation, the indication information may indicate a start point of a listening time window.

In a possible implementation, the indication information may indicate the first device to listen to the response message of the first message from the third device in the first period.

In a possible implementation, the indication information may be one or more of the following: ACK acknowledgment information, indication information of one or more first periods, and information indicating whether to perform listening.

In an example, if the priority of the first message is high (for example, greater than or equal to a specified priority, or a priority identifier of the first message is a high priority), the first device may listen to the indication information from the second device before the first period arrives. If the priority of the first message is low (for example, less than or equal to the specified priority, or the priority identifier of the first message is a low priority), the first device may listen to the response message of the first message from the third device in the first period.

In addition, the possible implementation of the fifth aspect is the same as the possible implementation of the first aspect and the possible implementation of the third aspect. Technical effects are also the same. Details are not repeated.

According to a sixth aspect, a communication method is provided. The method is applied to a second device or a chip in the second device. First, the second device may receive a first message from a first device. Then, the second device may determine, based on a priority of the first message, whether to send indication information to the first device before a first period (a base station response period) arrives. The indication information may indicate time information for listening to a response message of the first message from a third device. When determining to send the indication information to the first device before the first period (the base station response period) arrives, the second device may send the indication information to the first device before the first period arrives. When determining that it is not necessary to send the indication information to the first device before the first period (the base station response period) arrives, the second device may not send the indication information to the first device. The first period is pre-configured, and the first period is used by the first device to listen to the response message of the first message from the third device. The second device sends the first message to the third device. A sequence in which the second device sends the first message to the third device and the second device sends a second message to the first device is not limited.

Based on the priority of the first message, an occasion for listening to the response message of the first message is flexibly selected, so that efficiency of forwarding a message by the second device to the third device and a delay of sending a message by the first device can be balanced.

In a possible implementation, the second device may further receive priority indication information from the first device, where the priority indication information indicates the priority of the first message. The first message bears service-related information, and the priority indication information may alternatively indicate a priority of a service borne by the first message. The priority of the first message is explicitly indicated by using the indication information. The priority indication information may be carried in control information. The control information may be, for example, sidelink control information (side link control information, SCI). The priority indication information may alternatively be carried in data, for example, carried in a media access control (media access control, MAC) control element (control element, CE).

In a possible implementation, the second device may receive the first message from the first device on a first resource. The first resource may indicate the priority of the first message. In other words, the second device may receive the first message on the first resource corresponding to the priority of the first message. Different sending resources in the first device are corresponding to different priorities. The first resource may include resources such as a time domain resource, a frequency domain resource, and a code domain resource. The priority is implicitly indicated by using the sending resource.

In a possible implementation, the indication information may indicate a start point of a listening time window.

In a possible implementation, the indication information may indicate the first device to listen to the response message of the first message from the third device in the first period.

In a possible implementation, the indication information may be one or more of the following: ACK acknowledgment information, indication information of one or more first periods, and information indicating whether to perform listening.

In a possible implementation, when the priority of the first message is high (for example, greater than or equal to a specified priority, or a priority identifier of the first message is a high priority), the second device may send the indication information to the first device before the first period arrives. When the priority of the first message is low (for example, less than or equal to the specified priority, or the priority identifier of the first message is a low priority), the second device may not send the indication information to the first device.

In addition, the possible implementation of the sixth aspect is the same as the possible implementation of the second aspect and the possible implementation of the fourth aspect. Technical effects are also the same. Details are not repeated.

According to a seventh aspect, a communication apparatus is provided. The apparatus is capable of implementing a function in any one the first aspect and the possible implementations of the first aspect, the second aspect and the possible implementations of the second aspect, the third aspect and the possible implementations of the third aspect, the fourth aspect and the possible implementations of the fourth aspect, the fifth aspect and the possible implementations of the fifth aspect, or the sixth aspect and the possible implementations of the sixth aspect. The function may be implemented by hardware, or may be implemented by hardware executing corresponding software. The hardware or software includes one or more functional modules corresponding to the foregoing function.

In a possible implementation, a sending module is configured to send a first message to a second device; and a receiving module is configured to start to listen to a response message of the first message from a third device at a start point of a listening time window.

In a possible implementation, the receiving module is further configured to receive a second message from the second device, where the second message indicates the start point. Alternatively, the apparatus includes a processing module, where the processing module is configured to determine the start point based on a first resource used to send the first message; or the apparatus includes a processing module, where the processing module is configured to determine the start point based on a second resource associated with a first resource used by the first device to send the first message, and the second resource is used by the second device to send the first message to the third device.

In a possible implementation, the receiving module is further configured to receive an association relationship that is between the first resource and the second resource and that is configured by the second device or the third device.

In a possible implementation, when being configured to determine the start point based on the first resource used to send the first message, the processing module is specifically configured to determine the start point based on a time domain offset and the first resource.

In a possible implementation, the receiving module is further configured to receive the time domain offset configured by the second device or the third device.

In a possible implementation, the sending module is further configured to send priority indication information to the second device for the first device, where the priority indication information indicates a priority of the first message.

In a possible implementation, when being configured to send the first message to the second device, the sending module is specifically configured to send the first message to the second device on the first resource corresponding to a priority of the first message.

In a possible implementation, when being configured to start to listen to the response message of the first message from the third device at the start point of listening, the receiving module is specifically configured to: when a priority of the first message is higher than or equal to a specified priority, or when the first device determines that a priority identifier of the first message is a high priority, start, by the first device, to listen to the response message of the first message from the third device at the start point of listening.

In a possible implementation, a receiving module is configured to receive a first message from a first device; and a sending module is configured to: send the first message to a third device, and send a second message to the first device. The second message indicates a start point of a listening time window, and the start point of the listening time window is used by the first device to listen to a response message of the first message from the third device.

According to an eighth aspect, a computer program product is provided. The computer program product includes: computer program code, where when the computer program code is run on a computer, the computer is enabled to perform the method performed by the first device in any one of the first aspect and the possible implementations of the first aspect, the third aspect and the possible implementations of the third aspect, or the fifth aspect and the possible implementations of the fifth aspect, or perform the method performed by the second device in any one of the second aspect and the possible implementations of the second aspect, the fourth aspect and the possible implementations of the fourth aspect, or the sixth aspect and the possible implementations of the sixth aspect.

According to a ninth aspect, this application provides a chip system. The chip system includes a processor and a memory, and the processor and the memory are electrically coupled. The memory is configured to store computer program instructions. The processor is configured to execute a part of or all of the computer program instructions in the memory. When the part of or all of the computer program instructions are executed, functions of the first device in the method according to any one of the first aspect and the possible implementations of the first aspect, the third aspect and the possible implementations of the third aspect, or in the fifth aspect and the possible implementations of the fifth aspect are implemented, or functions of the second device in any one of the second aspect and the possible implementations of the second aspect, the fourth aspect and the possible implementations of the fourth aspect, or the sixth aspect and the possible implementations of the sixth aspect are implemented.

In a possible design, the chip system may further include a transceiver. The transceiver is configured to send a signal processed by the processor, or receive a signal input to the processor. The chip system may include a chip, or may include a chip and another discrete component.

For technical effects of the seventh aspect to the ninth aspect, refer to the descriptions of the first aspect to the sixth aspect. Details are not described herein again.

DESCRIPTION OF EMBODIMENTS

Figure 1A:
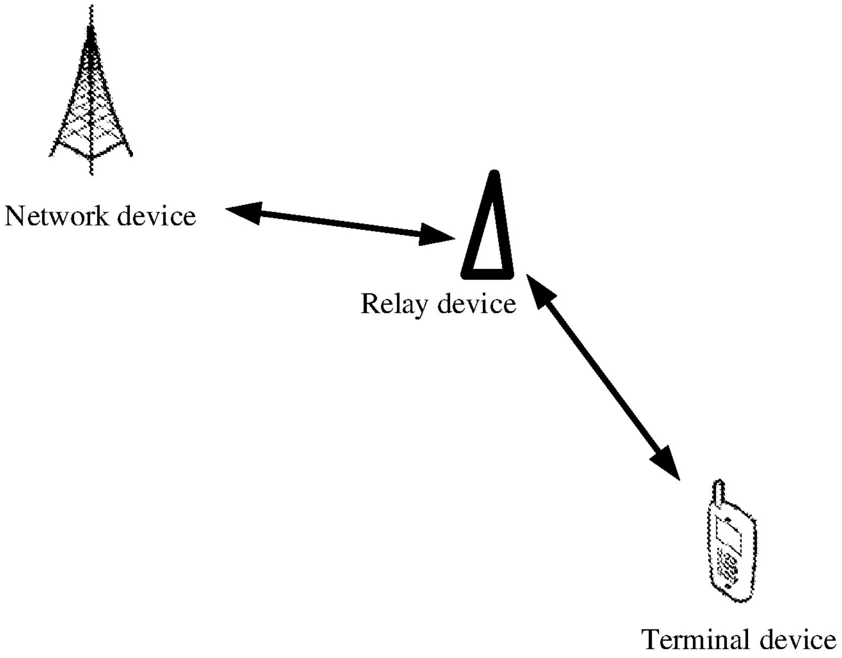
FIG. 1*a* is a schematic diagram of a structure of a communication system using a relay technology according to an embodiment of this application.

The following describes in detail embodiments of this application with reference to accompanying drawings.

For ease of understanding embodiments of this application, the following describes a part of terms in embodiments of this application, to help a person skilled in the art have a better understanding.

(1) A network device is a device capable of providing a random access function for a terminal device or a chip that can be disposed in the device. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, home evolved NodeB or home NodeB, HNB), a baseband unit (baseband unit, BBU), an access point (access point, AP) in a wireless fidelity (wireless fidelity, Wi-Fi) system, a wireless relay node, a wireless backhaul node, a transmission and reception point (transmission and reception point, TRP, or transmission point, TP), or the like, may be a gNB or a transmission point (TRP or TP) in a 5G system such as an NR system or one or one group of antenna panels (including a plurality of antenna panels) of a base station in a 5G system, or may be a network node forming a gNB or a transmission point, for example, a baseband unit (BBU) or a distributed unit (DU, distributed unit).

(2) A terminal device, also referred to as user equipment (user equipment, UE), a mobile station (mobile station, MS), a mobile terminal (mobile terminal, MT), a terminal, or the like, is a device that provides voice and/or data connectivity for users. For example, the terminal device is a handheld device, a vehicle-mounted device, or the like that has a wireless connection function. Currently, the terminal device may be a mobile phone (mobile phone), a tablet computer, a laptop computer, a palmtop computer, a mobile Internet device (mobile internet device, MID), a wearable device, a virtual reality (virtual reality, VR) device, an augmented reality (augmented reality, AR) device, a wireless terminal in industrial control (industrial control), a wireless terminal in self driving (self driving), a wireless terminal in remote surgery (remote medical surgery), a wireless terminal in a smart grid (smart grid), a wireless terminal in transportation safety (transportation safety), a wireless terminal in a smart city (smart city), a wireless terminal in a smart home (smart home), a wireless terminal in vehicle-to-vehicle (Vehicle-to-Vehicle, V2V) communication, or the like.

(3) A relay device is an entity capable of receiving information from a terminal device, a network device, or another relay device, and forwarding the information to another terminal, another network device, or another relay device. A form of the relay device may be a small cell, an integrated access and backhaul (integrated access and backhaul, IAB) node, a distributed unit (distributed unit, DU), a terminal device, a transmission and reception point (transmitter and receiver point, TRP), or the like.

The term "and/or" in this application describes an association relationship for describing associated objects and represents that three relationships may exist. For example, A and/or B may represent the following three cases: Only A exists, both A and B exist, and only B exists. The character "/" generally indicates an "or" relationship between the associated objects. "A plurality of" in this application means two or more. In addition, it should be understood that in description of this application, terms such as "first" and "second" are merely used for distinguishing and description, but should not be understood as indicating or implying relative importance, or should not be understood as indicating or implying a sequence.

The technical solutions in embodiments of this application may be applied to various communication systems, for example, a long term evolution (long term evolution, LTE) system, a worldwide interoperability for microwave access (worldwide interoperability for microwave access, WiMAX) communication system, a 5th generation (5th Generation, 5G) system, such as a new radio access technology (new radio access technology, NR), and a future communication system.

For ease of understanding embodiments of this application, the following describes an application scenario of this application. A network architecture and a service scenario described in embodiments of this application are intended to describe the technical solutions in embodiments of this application more clearly, and do not constitute a limitation on the technical solutions provided in embodiments of this application. A person of ordinary skill in the art may know that, as a new service scenario emerges, the technical solutions provided in embodiments of this application are also applicable to a similar technical problem.

When a large quantity of terminals directly access a network or send data through an air interface, network congestion is prone to occur, reducing an access success rate or a data transmission success rate. For example, in a random access scenario, when a large quantity of terminals perform random access at a same time, a random access preamble (preamble) collision (collision) occurs (where the collision occurs when a plurality of terminals send a same preamble on a same time-frequency resource), causing an access failure. For another example, in a data transmission scenario, when a large quantity of terminals send uplink data to a network device at a same time, a demodulation reference signal (demodulation reference signal, DMRS) collision occurs, causing a data transmission failure. In the data transmission scenario, grant-free transmission may be used, or granted transmission (that is, before receiving and sending data, the terminal needs to listen to physical control information (downlink control information, DCI) that is delivered by the network device and that is for dynamically scheduling data receiving and sending) may be used.

The following describes a solution in which a relay (relay) technology is used to improve data transmission reliability or reduce air interface random access collisions.

As shown in FIG. 1*a*, for downlink transmission, a relay device receives data sent by a network device, and forwards the data to a terminal device. For uplink transmission, the relay device receives data sent by the terminal device, and forwards the data to the network device. A distance between the relay device and the terminal device is usually less than a distance between the network device and the terminal device. Therefore, a channel between the relay device and the terminal device and a channel between the relay device and the network device are usually better than a channel between the network device and the terminal device. In this case, data transmission between the network device and the terminal device via an air interface is converted into two-step transmission between the network device and the relay device and between the relay device and the terminal device. In this way, data transmission reliability can be improved and terminal power consumption can be reduced, where the effect is especially obvious for a cell edge user.

Figure 1B:
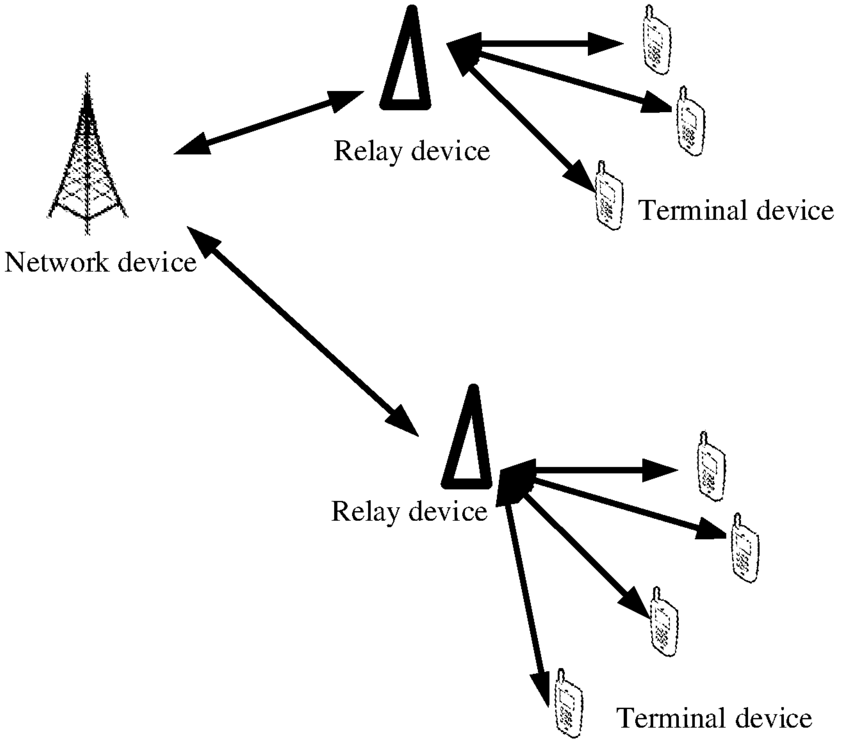
FIG. 1*b* is a schematic diagram of a structure of a communication system using a relay technology according to an embodiment of this application.

Still as shown in FIG. 1*b*, a relay device may aggregate data or request information of a plurality of terminals for forwarding. For example, the relay device receives access requests of a plurality of terminal devices, and accesses a network in a cluster (cluster) or group (group) manner, to reduce a quantity of access times of an air interface, thereby reducing preamble collisions, that is, thereby reducing air interface collisions. For another example, after receiving data packets of a plurality of terminal devices, the relay device aggregates the received plurality of data packets sent by the plurality of terminal devices (for example, aggregates the plurality of data packets together for channel coding), and then forwards the aggregated plurality of data packets to a network device. In this way, compared with a manner in which forwarding is performed immediately after a data packet is received, using this manner can obtain coding gains and frequency domain diversity gains, reduce a quantity of times of data transmission over the air interface, and further reduce DMRS collisions.

Figure 1C:
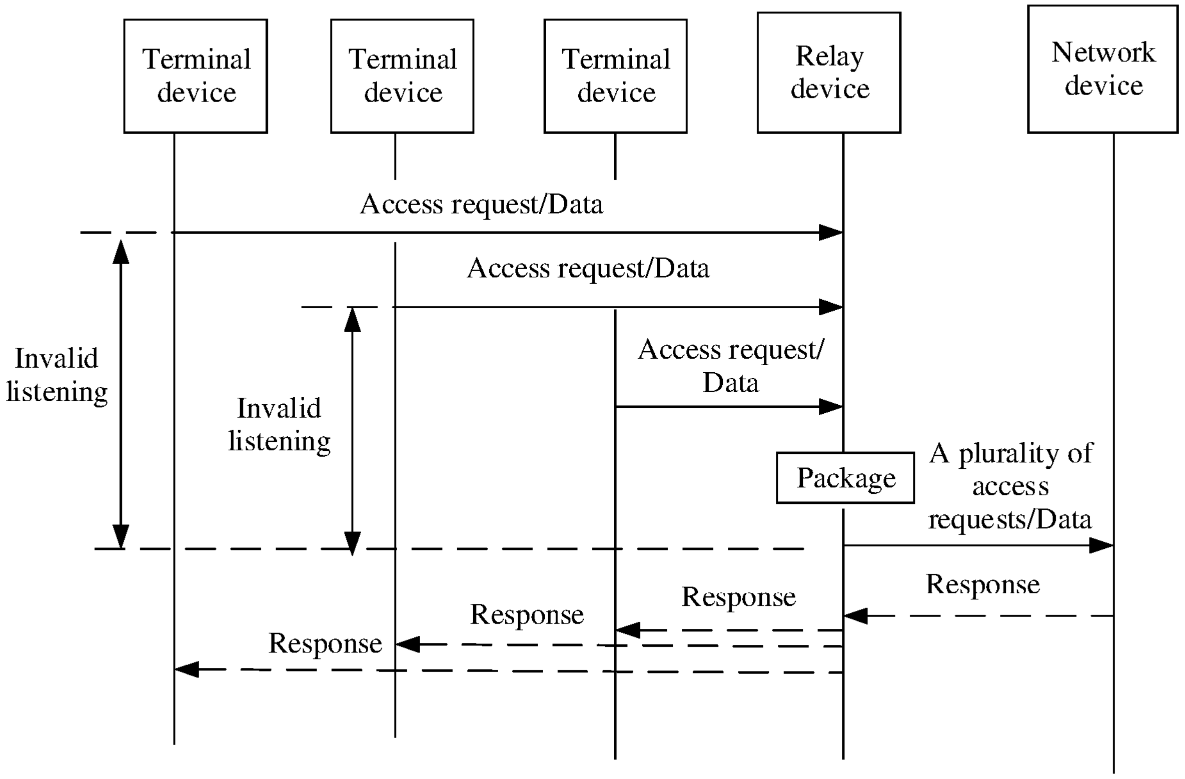
FIG. 1*c* is a schematic diagram of a communication process according to an embodiment of this application.

With reference to FIG. 1*c*, in this transmission manner in FIG. 1*b*, if the relay device does not immediately forward the access request or data sent by the terminal device to the network device each time after receiving the access request or the data sent by the terminal device, but the relay device waits for an access request or data of another terminal device, and packs the plurality of access requests or the data of the plurality of terminal devices for forwarding, the following problem is caused.

If the terminal device immediately starts to listen to a response message from the relay device or the network device (where the response message may be directly from the network device, or may be sent by the network device to a member device via forwarding of the relay device) after sending the access request or the data to the relay device, invalid listening is caused, increasing power consumption of the terminal device.

Based on this, the following describes a plurality of communication methods in this application, to reduce power consumption caused by the invalid listening. Devices that perform a communication procedure include a first device, a second device, and a third device. The first device sends a message to the second device, and the second device sends the message of the first device to the third device. The third device directly sends a response to the first device, or the third device sends a response to the first device via the second device.

For example, the first device may be the terminal device in FIG. 1*b*, the second device may be the relay device in FIG. 1*b*, and the third device may be the network device in FIG. 1*b*. For another example, the first device may be a relay device, the second device may be a relay device, and the third device may be a relay device. For another example, the first device may be a terminal device, the second device is a relay device, and the third device is a relay device. For another example, the first device is a relay device, the second device is a relay device, and the third device is a network device.

Optionally, the second device and one or more first devices associated with the second device may form a cluster (cluster) or a group (group). That the second device is associated with a first device means that the second device may forward a network access request, a response, uplink data, downlink data, and the like of the first device. For example, the second device may be referred to as a cluster head device, and the one or more first devices associated with the second device may be referred to as member devices. The cluster head device and the member devices form a cluster. One cluster head device may be associated with one or more member devices. Similarly, one member device may also be associated with one or more cluster head devices. A member device of a cluster may also be a cluster head device of another cluster. A process and a method for clustering the member device and the cluster head device are not limited in this application.

Figure 2A:
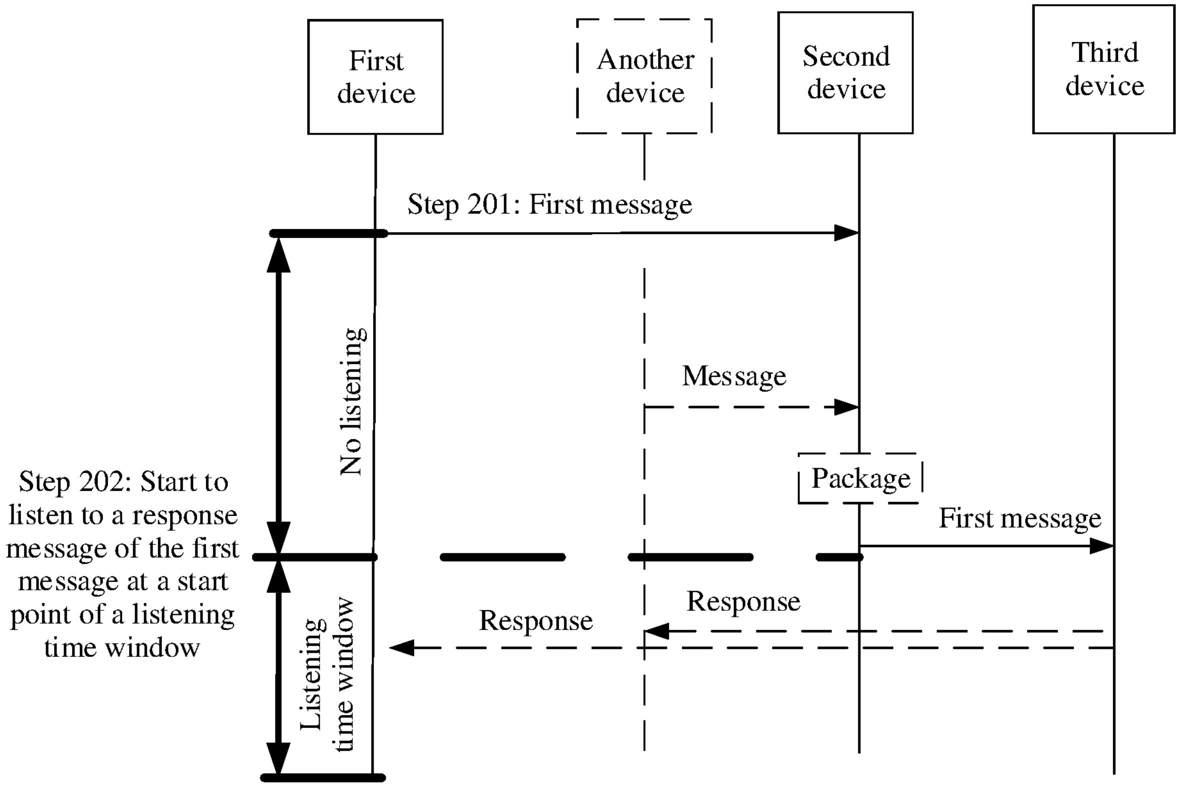
FIG. 2*a* is a schematic diagram of a communication process according to an embodiment of this application.

In a communication method shown in FIG. 2*a*, a listening time window is set for a first device, and the first device listens to a response only in the listening time window.

Step 201: The first device sends a first message to a second device, and correspondingly, the second device receives the first message from the first device.

When the first device is a terminal device, the terminal device may be in a connected state (CONNECTED), an active state (ACTIVE), an inactive state (INACTIVE), an idle state (IDLE), or the like. This is not limited.

The first message sent by the first device to the second device may be data information, or may be various kinds of request information, or the like. The data may be, for example, application layer data, user plane (user plane, UP) data, or control plane (control plane, CP) data (for example, an identifier ID of the first device). The request may be a network access request (for example, a sequence).

The first device may send the first message to the second device on a first resource. The first resource includes one or more of the following resources: a time domain resource, a frequency domain resource, and a code domain resource.

The first resource and a transmission parameter (for example, a modulation and coding scheme (modulation and coding scheme, MCS)) that are used by the first device to send the first message to the second device may be configured by the second device for the first device, or may be configured by a third device for the first device. The first resource may be a grant-free resource, or may be a dynamic scheduling-based resource.

Optionally, after sending the first message to the second device, the first device may start to listen to a second message from the second device, where the second message indicates related information of the listening time window. Certainly, the first device may alternatively determine the listening time window by itself, and does not need to listen to the second message from the second device.

When the first device sends the first message to the second device, another device may send a message to the second device. The second device may send the first message from the first device to the third device. Optionally, the second device may pack the first message from the first device and the message from the another device, and send the packed messages to the third device. Optionally, the second device may not pack the first message with another message, but separately send the first message to the third device.

Step 202: The first device may listen to a response message of the first message from the third device in the listening time window. A start point of the listening time window may be determined based on the first message, for example, based on the first resource for sending the first message, or the second device indicates the start point of the listening time window to the first device after receiving the first message.

The listening time window includes the start point and an end point. To be specific, the first device starts to listen to the response message of the first message at the start point of the listening time window, and does not listen to the response message of the first message before the start point of the listening time window arrives. If the first device detects the response message of the first message in the listening time window, the first device may stop listening. If the first device does not detect the response message of the first message until the end point of the listening time window, the first device also stops listening.

The response message of the first message may be sent by the third device to the first device, or may be sent by the third device to the first device via the second device. After receiving the first message sent by the first device, the second device forwards the first message to the third device. The third device feeds back the response message to the first device only after receiving the first message forwarded by the second device.

There are two manners in which the first device directly listens to the response message sent by the third device. In one manner, the first device listens to downlink control information (downlink control information, DCI) sent by the third device, and then receives the response message based on an indication of the DCI. The DCI is carried on a physical downlink control channel (physical downlink control channel, PDCCH), the response message is carried on a physical downlink shared channel (physical downlink shared channel, PDSCH), and transmission of a PDSCH is scheduled by the DCI carried on the PDCCH. In the other manner, the first device receives transmission of a PDSCH on one or more pre-configured time-frequency resources, where the PDSCH carries the response message.

There are also two manners in which the first device listens to the response message sent by the second device, that is, the response message is sent by the third device to the first device via forwarding of the second device. In one manner, the first device listens to scheduling information (for example, sidelink control information SCI on a sidelink (sidelink)) sent by the second device. The scheduling information is for scheduling transmission of a data channel (for example, a physical sidelink shared channel PSSCH), and the data channel carries the response message. In the other manner, the first device receives transmission of a data channel on one or more pre-configured time-frequency resources, and the data channel carries the response message.

The response message of the first message may include one or more of the following information: a contention resolution identity (contention resolution identity), an identity of the first device (for example, a radio network temporary identity (radio network temporary identity, RNTI) or an identity of the first device in a cluster), a synchronization parameter (for example, a timing advance (timing advance, TA)), a radio resource control RRC message (for example, resource allocation information), security information (for example, a key to be used by the first device to send a message next time), and the like.

The first device starts to listen to the response message at the start point of the listening time window, and does not listen to the response message before the start point of the listening time window arrives. In this manner of determining the listening time window, the first device does not perform listening too early. Therefore, power consumption of the first device is reduced.

The following uses a specific example to describe in detail the manner of determining the listening time window in FIG. 2*a*.

In Example 1, the second device configures for the first device one or more of the following: a start point, an end point, and a length of a listening time window.

Figure 2B:
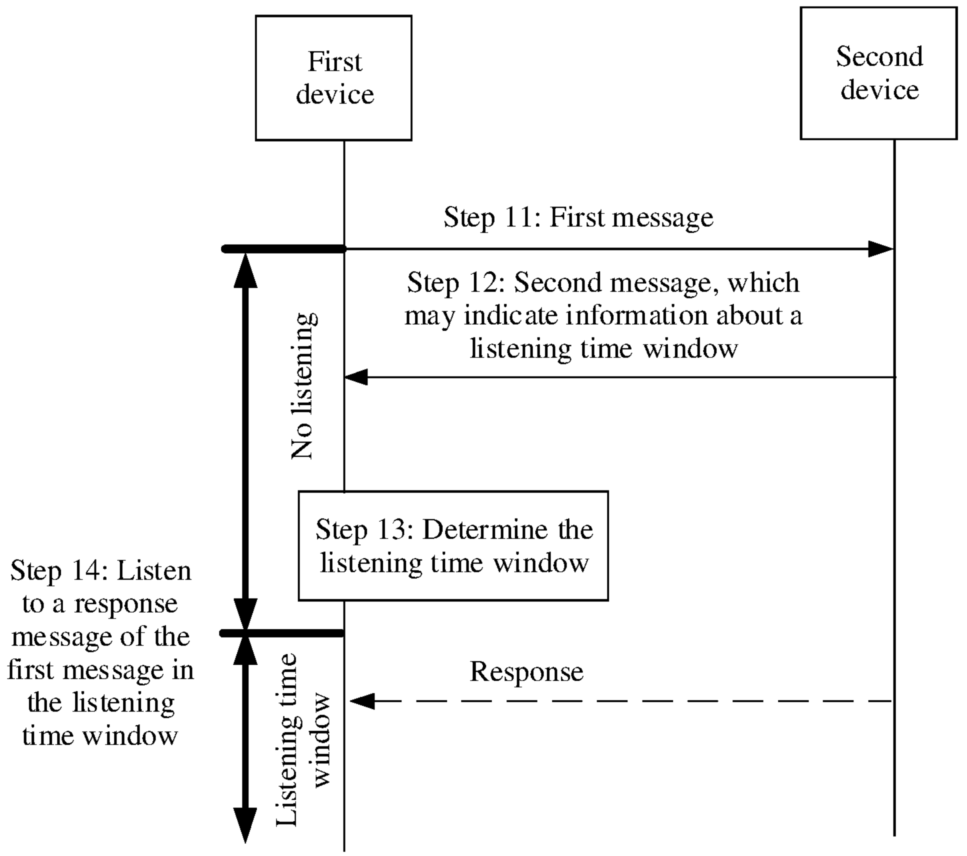
FIG. 2*b* is a schematic diagram of a communication process according to an embodiment of this application.

As shown in FIG. 2*b*, the following steps are included.

Step 11: The first device sends a first message to the second device, and correspondingly, the second device receives the first message from the first device. Step 11 is the same as Step 201 in FIG. 2*a*. Details are not repeated. The second device sends the first message to the third device. A sequence in which the second device sends the first message to the third device and the second device sends a second message to the first device is not limited.

After sending the first message to the second device, the first device may start to listen to the second message from the second device.

Step 12: The second device sends the second message to the first device, and correspondingly, the first device receives the second message from the second device. The second message may indicate related information of the listening time window.

Specifically, the second message may indicate one or more of the following information: the start point of the listening time window, the end point of the listening time window, and the length of the listening time window.

For example, the start point of the listening time window is the first symbol (for example, a start point or an end point of the first symbol) of a slot whose index is $n+k1$ ($n \geq 0$, $k1 \geq 0$), the end point of the listening time window is the last symbol (for example, a start point or an end point of the last symbol) of a slot whose index is $n+k2$ ($k2 \geq k1$), and the length is $k2-k1$ slots, where n is a slot in which the first message is located.

For another example, the start point of the listening time window is the last symbol (for example, a start point or an end point of the last symbol) of a slot whose index is n+k1, and the end point of the listening time window is the last symbol (for example, a start point or an end point of the last symbol) or the first symbol (for example, a start point or an end point of the first symbol) of a slot whose index is n+k2.

For another example, the start point of the listening time window is a symbol in a slot whose index is n+k1.

For another example, the start point of the listening time window is a symbol in a slot whose index is n+k2.

The preceding limitation conditions are universal: n≥0, k1≥0, and k2≥k1.

When indicating the start point and/or the end point of the listening time window, the second message may directly indicate the start point and/or the end point of the listening time window. For example, the second message indicates that the first symbol of the slot whose index is n+k1 is the start point. For example, the second message indicates that the last symbol of the slot whose index is n+k2 is the end point.

When indicating the start point and/or the end point of the listening time window, the second message may alternatively indicate a time domain offset (offset). The first device may determine the start point and/or the end point of the listening time window based on the time domain offset (offset). Specifically, the first device may determine the start point and/or the end point of the listening time window based on the time domain offset (offset) and a reference point. For example, if the reference point is a slot whose index is n, and the offset indicated by the second message is k1 slots, the first device may determine that the start point of the listening time window is the slot whose index is n+k1, and may be specifically the first symbol of the slot whose index is n+k1.

The reference point may be protocol specified. The reference point may be related to a time unit in which the first device sends the first message. For example, it is pre-agreed that the reference point is the time unit in which the first device sends the first message. Specifically, the reference point may be a start time unit or an end time unit. The reference point may alternatively be irrelevant to a time unit in which the first device sends the first message. For example, it is pre-agreed that the reference point is a closest time unit that meets a condition before or after the first device receives the second message. For example, the reference point is the first symbol of a frame whose index is 0 before the first device receives the second message. The time unit herein may be a frame (frame), a subframe (subframe), a slot (slot), a mini-slot, a symbol (symbol), or the like. Time domain offset (offset) may be measured in frames, subframes, slots, mini-slots, symbols, milliseconds, or the like.

Alternatively, the reference point may be indicated by the second device to the first device via the second message after the second device receives the first message. Specifically, the second message may include a first indication indicating the reference point, the time domain offset (offset), and the like. For example, the first indication may indicate that the reference point is the slot whose index is n and indicate that the offset is the k1 slots. In this case, the first device may determine that the start point of the listening time window is the slot whose index is n+k1.

Alternatively, the reference point may be pre-configured by the second device or the third device. For example, the third device configures the reference point for the first device using RRC signaling, DCI signaling, or a MAC CE. For another example, the second device configures the reference point for the first device using DCI, SCI, a MAC CE, or RRC. For example, the reference point is pre-configured as the time unit in which the first device sends the first message. Specifically, the reference point may be the start time unit or the end time unit. For another example, the reference point is pre-configured as the closest time unit that meets the condition before or after the first device receives the second message, for example, the first symbol of the frame whose index is 0 before the first device receives the second message.

The first device may determine the start point and the end point of the listening time window based on the reference point and the time domain offset. Alternatively, the first device may determine the start point of the listening time window based on the reference point and the time domain offset, and then determine the end point of the listening time window based on the length. Alternatively, the first device may determine the end point of the listening time window based on the reference point and the time domain offset, and then determine the start point of the listening time window based on the length. A manner of determining the end point is the same as the manner of determining the start point described above. Details are not repeated.

The length of the listening time window may be protocol specified. For example, an agreed length is k3 (k3>0) slots.

Alternatively, the length of the listening time window may be indicated by the second device to the first device via the second message after the second device receives the first message. For example, the second message may include the first indication indicating the reference point, the time domain offset (offset), the length of the listening time window, and the like.

Alternatively, the length of the listening time window may be pre-configured by the second device or the third device. For example, the third device configures the length of the listening time window for the first device using the RRC signaling, the DCI signaling, or the MAC CE. For another example, the second device configures the length of the listening time window for the first device using the DCI, the SCI, the MAC CE, or the RRC. The length of the listening time window may be measured in frames, subframes, slots, mini-slots, symbols, milliseconds, or the like.

The information indicated by the second message may be carried in control information, for example, the downlink control information (Downlink Control Information, DCI) or the sidelink control information (side link control information, SCI) to be sent to the first device. The information indicated by the second message may alternatively be carried in data, for example, the media access control (media access control, MAC) control element (control element, CE) to be sent to the first device.

When the second message indicates the information, in addition to directly indicating values of the information, the second message may also indicate an index (index). The first device determines a value of corresponding information based on the index (index) indicated by the second message. For example, when indicating the offset (offset), the second message may indicate an index of the offset (offset), and the first device determines a corresponding offset based on the index of the offset.

Optionally, the second message may further include ACK acknowledgment information of the first message indicating that the second device successfully receives the first message sent by the first device. Herein, the ACK acknowledgment information may also indicate the first device to start to listen to a response message of the first message from the third device at the start point of the listening time window. In other words, no ACK acknowledgment information is received, the first device does not start to listen to the response message of the first message from the third device at the start point of the listening time window.

Step 13: The first device determines the listening time window based on the second message, to be specific, determines the start point and the end point of the listening time window.

For example, the first device determines the end point of the listening time window, that is, determines the listening time window, based on the start point and the length that are indicated in the second message.

For another example, the first device determines the start point of the listening time window, that is, determines the listening time window, based on the end point and the length that are indicated in the second message.

For another example, the first device determines the listening time window based on the start point and the end point that are indicated in the second message.

Step 14: The first device listens to the response message of the first message from the third device in the listening time window. Step 14 is the same as Step 202 in FIG. 2*a*. Details are not repeated.

In Example 1, the second device delivers indication information to notify the first device of the information about the listening time window. In this way, the first device does not start listening for response too early, avoiding invalid listening, and reducing power consumption of the first device.

In Example 2, a sending resource of the first device is associated with a start point and/or an end point of a listening time window, and the listening time window is determined based on the sending resource of the first device.

Figure 2C:
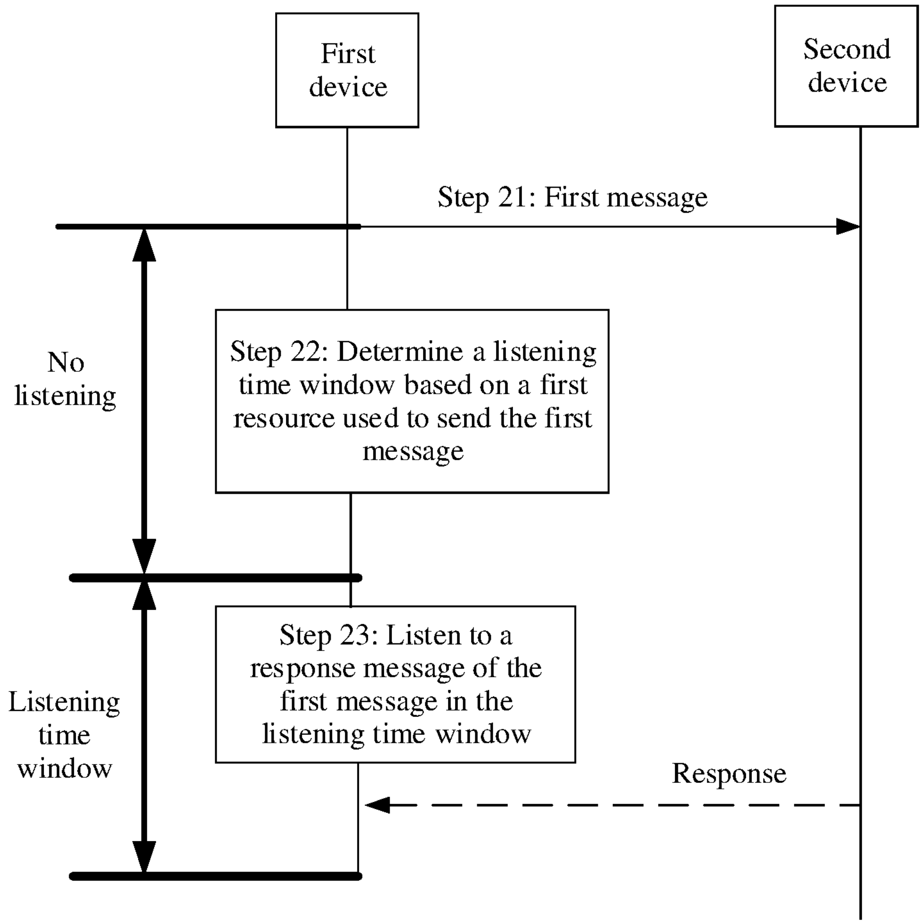
FIG. 2*c* is a schematic diagram of a communication process according to an embodiment of this application.

As shown in FIG. 2*c*, the following steps are included.

Step 21: The first device sends a first message to the second device, and correspondingly, the second device receives the first message from the first device. Step 21 is the same as Step 201 in FIG. 2*a*. Details are not repeated. The second device sends the first message to the third device.

Step 22: The first device determines the start point and/or the end point of the listening time window based on a first resource used to send the first message.

For example, the first device determines the start point and/or the end point based on a time domain offset (offset) and the first resource. For example, a start time unit or an end time unit of the first resource is used as a reference point, and the start point of the listening time window is determined based on the time domain offset (offset). The time unit herein may be a frame (frame), a subframe (subframe), a slot (slot), a mini-slot, a symbol (symbol), or the like. Time domain offset (offset) may be measured in frames, subframes, slots, mini-slots, symbols, milliseconds, or the like.

For example, if an end slot of the first resource is used as the reference point, an index of the end slot is n, and the offset is k1 slots, the first device determines that the start point of the listening time window is the first symbol of a slot whose index is n+k1.

In Example 2, the time domain offset (offset) may be protocol pre-agreed, or may be pre-configured by the second device or the third device. For example, the third device configures the time domain offset (offset) for the first device using RRC signaling, DCI signaling, or a MAC CE. For another example, the second device configures the time domain offset (offset) for the first device using DCI, SCI, a MAC CE, or RRC. Optionally, there is an association relationship between a resource used by the first device to send a message to the second device and an offset. When the first device selects different resources to send the first message to the second device, offsets may be different. An implementation of the association relationship may be as follows: The third device or the second device configures an offset associated with the resource while the third device or the second device configures, for the first device, the resource for sending the message to the second device.

In Example 2, the reference point may be protocol specified, or may be pre-configured by the second device or the third device. For example, the third device configures the reference point for the first device using the RRC signaling, the DCI signaling, or the MAC CE. For another example, the second device configures the reference point for the first device using the DCI, the SCI, the MAC CE, or the RRC.

The first device may determine the start point and the end point of the listening time window based on the reference point and the time domain offset. Alternatively, the first device may determine the start point of the listening time window based on the reference point and the time domain offset, and then determine the end point of the listening time window based on a length. Alternatively, the first device may determine the end point of the listening time window based on the reference point and the time domain offset, and then determine the start point of the listening time window based on a length. A manner of determining the end point is the same as the manner of determining the start point described above. Details are not repeated.

The length of the listening time window may be protocol pre-agreed, or may be pre-configured by the second device or the third device. For example, the third device configures the length for the first device using RRC signaling, DCI signaling, or a MAC CE. For another example, the second device configures the length for the first device using DCI, SCI, a MAC CE, or RRC signaling. Optionally, there is an association relationship between a resource used by the first device to send the message to the second device and the length. In the case that the first device selects different resources to send the first message to the second device, lengths may be different. An implementation of the association relationship may be as follows: The third device or the second device configures a length associated with the resource while the third device or the second device configures, for the first device, the resource for sending the message to the second device.

A difference from Example 1 lies in that the listening time window in Example 1 is determined by the first device based on the first indication in the second message from the second device. For example, the first indication directly indicates the start point, the end point, or the length of the listening time window, or indicates the time domain offset, and may further indicate the reference point, the length, or the like. In Example 2, the second device is not required to send indication information to the first device. The first device may determine the listening time window based on the time domain offset, the reference point, the length, or the like that is protocol specified or that is pre-configured by the second device or the third device. In this way, signaling overheads of the second device can be reduced.

Step 23: The first device listens to a response message of the first message from the third device in the listening time window. Step 23 is the same as Step 202 in FIG. 2*a*. Details are not repeated.

In Example 2, the listening time window is determined by preconfiguring the resource for sending the message by the first device to the second device. In this way, the first device does not start listening for response too early, avoiding invalid listening, and reducing power consumption of the first device.

In Example 3, a sending resource of the second device is associated with a start point of a listening time window, and the start point of the listening time window is determined based on the sending resource of the second device.

Figure 2D:
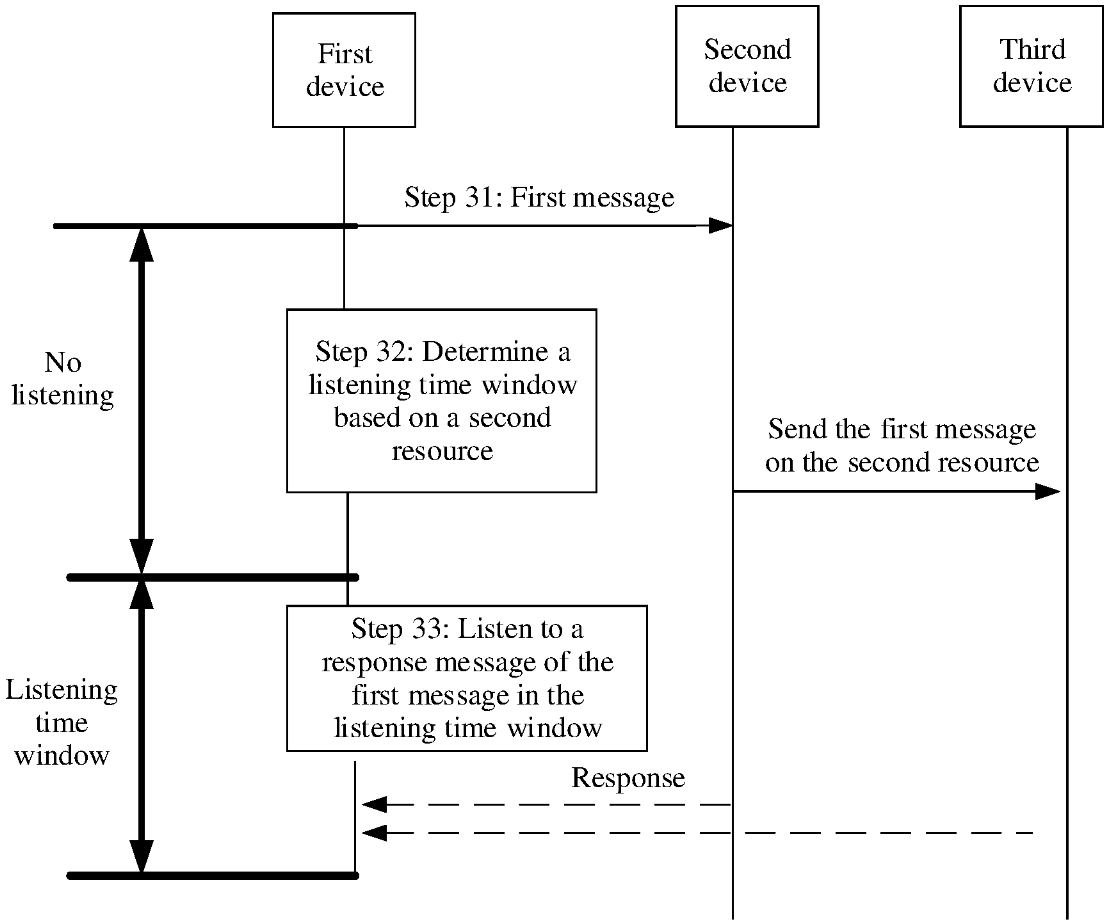
FIG. 2*d* is a schematic diagram of a communication process according to an embodiment of this application.

As shown in FIG. 2*d*, the following steps are included.

Step 31: The first device sends a first message to the second device, and correspondingly, the second device receives the first message from the first device. Step 31 is the same as Step 201 in FIG. 2*a*. Details are not repeated. The second device sends the first message to the third device.

Step 32: The first device determines the start point based on a second resource, where the second resource is used by the second device to send the first message to the third device.

The first device may determine the start point of the listening time window based on the second resource using the following methods, which are not limited.

Method 1: The first device determines a time unit in which the second resource is located as the start point of the listening time window. Specifically, the time unit may be a start time unit or an end time unit. The time unit herein may be a frame (frame), a subframe (subframe), a slot (slot), a mini-slot, a symbol (symbol), or the like. For example, a start point of the time unit may be determined as the start point of the listening time window, or an end point of the time unit may be determined as an end point of the listening time window. The time unit that is determined as the start point of the listening time window may be protocol specified, or may be pre-configured by the second device or the third device for the first device.

Method 2: The first device determines the start point and/or an end point of the listening time window based on the second resource and a time domain offset (offset). For example, a start time unit or an end time unit of the second resource is used as a reference point, and the start point of the listening time window is determined based on the time domain offset (offset). The time unit herein may be a frame (frame), a subframe (subframe), a slot (slot), a mini-slot, a symbol (symbol), or the like. Time domain offset (offset) may be measured in frames, subframes, slots, mini-slots, symbols, milliseconds, or the like.

For example, if an end slot of the second resource is used as the reference point, an index of the end slot is m, and the offset is k1 slots, the first device determines that the start point of the listening time window is the first symbol of a slot whose index is m+k1, where m is greater than or equal to 0.

Similar to Example 2, in Example 3, the time domain offset (offset) may be protocol pre-agreed, or may be pre-configured by the second device or the third device. For example, the third device configures the time domain offset (offset) for the first device using RRC signaling, DCI signaling, or a MAC CE. For another example, the second device configures the time domain offset (offset) for the first device using DCI, SCI, a MAC CE, or RRC.

Method 3: The first device uses, as the start point of the listening time window, a start symbol of a closest time domain resource that is located after the second resource and that is for sending a response message or scheduling information of response message.

When the response message is directly sent by the third device to the first device in a dynamic scheduling manner, the first device uses, as the start point of the listening time window, a start symbol of a resource that is an earliest resource located after the second resource and that is for sending a PDCCH. The PDCCH is for scheduling transmission of a PDSCH carrying the response message.

When the response message is directly sent by the third device to the first device in a dynamic grant-free manner, the first device uses, as the start point of the listening time window, a start symbol of a resource that is an earliest resource located after the second resource and that is for sending a PDSCH carrying the response message.

When the response message is sent by the second device to the first device in a dynamic scheduling manner, the first device uses, as the start point of the listening time window, a start symbol of a resource that is an earliest resource located after the second resource and that is for sending a control channel (for example, a PDCCH or a PSCCH). The control channel is for scheduling transmission of a data channel (for example, a PDCCH or a PSSCH) carrying the response message.

When the response message is sent by the second device to the first device in a dynamic grant-free manner, the first device uses, as the start point of the listening time window, a start symbol of a resource that is an earliest resource located after the second resource and that is for sending a data channel (for example, a PDSCH or a PSSCH) carrying the response message.

The first device may determine the start point and the end point of the listening time window based on the reference point and the time domain offset. Alternatively, the first device may determine the start point of the listening time window based on the reference point and the time domain offset, and then determine the end point of the listening time window based on a length. Alternatively, the first device may determine the end point of the listening time window based on the reference point and the time domain offset, and then determine the start point of the listening time window based on a length. A manner of determining the end point is the same as the manner of determining the start point described above. Details are not repeated.

Similar to Example 2, in Example 3, the length of the listening time window may be protocol pre-agreed, or may be pre-configured by the second device or the third device. For example, the third device configures the length for the first device using RRC signaling, DCI signaling, or a MAC CE. For another example, the second device configures the length for the first device using DCI, SCI, a MAC CE, or RRC signaling. Optionally, there is an association relationship between a resource used by the first device to send a message to the second device and the length. In the case that the first device selects different resources to send the first message to the second device, lengths may be different. An implementation of the association relationship may be as follows: The third device or the second device configures a length associated with the resource while the third device or the second device configures, for the first device, the resource for sending the message to the second device.

A difference from Example 1 lies in that the listening time window in Example 1 is determined by the first device based on the first indication in the second message from the second device. For example, the first indication directly indicates the start point, the end point, or the length of the listening time window, or indicates the time domain offset, and may further indicate the reference point or the like. In Example 3, the second device is not required to send indication information to the first device. The first device may determine the listening time window based on the time domain offset, the reference point, the length, or the like that is protocol specified or that is pre-configured by the second device or the third device. In this way, signaling overheads of the second device can be reduced.

The first device may determine, by using one of the following methods, the second resource that is used by the second device to forward the first message to the third device, where the methods are not limited.

Method 1: There is an association relationship between a resource used by the first device to send a message to the second device and a resource used by the second device to forward the message of the first device to the third device. The association relationship may be pre-specified. For example, there is a mapping relationship between resource indexes. Alternatively, the association relationship may be configured by the second device or the third device. For example, the third device preconfigures the association relationship using RRC signaling, DCI signaling, or MAC CE, or the second device preconfigures the association relationship using DCI, SCI, a MAC CE, RRC, or the like. The first device may determine, based on the association relationship, a first resource used when the first device sends the first message to the second device, and the associated second resource used when the second device sends the first message to the third device.

For example, while the second device or the third device configures, for the first device, the resource used by the first device to send the message to the second device, the second device or the third device configures information about the resource that is associated with the resource and that is used by the second device to forward the message of the first device to the third device. For example, the information about the resource may be a number or an index of the resource.

Method 2: After receiving the first message sent by the first device, the second device may send the indication information to the first device. The indication information may be used by the first device to determine the second resource used by the second device to forward the first message, for example, determine an index, the start time unit, or the end time unit of the second resource.

Step 33: The first device listens to a response message of the first message from the third device in the listening time window. Step 33 is the same as Step 202 in FIG. 2*a*. Details are not repeated.

In Example 3, the listening time window is determined based on the resource used by the second device to forward the message from the first device. In this way, the first device does not start listening for response too early, avoiding invalid listening, and reducing power consumption of the first device.

Figure 3:
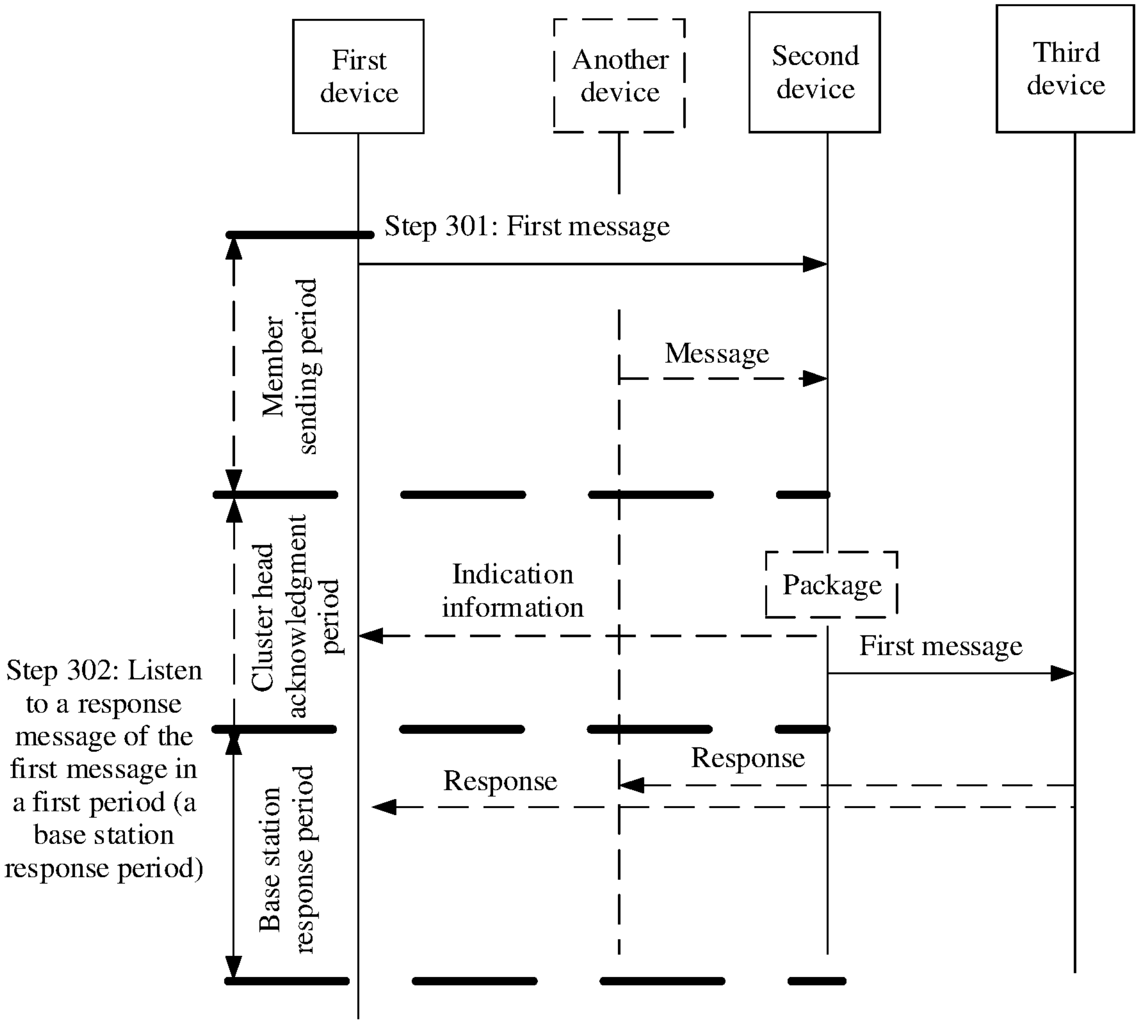
FIG. 3 is a schematic diagram of a communication process according to an embodiment of this application.

The following describes the method of Example 4 in FIG. 3. One or more periods for listening to a response message are pre-configured for the first device. The first device listens to the response message only in the period. For ease of distinguishing, the period for listening to the response message is referred to as a first period, or may be referred to as a base station response period (period).

Optionally, a period of sending a message to the second device may be pre-configured for the first device. For ease of distinguishing, the period for sending the message to the second device by the first device is referred to as a second period, or may be referred to as a member sending period (period).

Optionally, a period for receiving a message from the second device may alternatively be pre-configured for the first device. For ease of distinguishing, the period for receiving the message from the second device by the first device is referred to as a third period, or may be referred to as a cluster head acknowledgment period (period).

The first period, the second period, and the third period may appear cyclically. In one cycle, the second period (the member sending period) is earlier than the third period (the cluster head acknowledgment period), and the third period is earlier than the first period (the base station response period).

The first period is later than the second period, and the second period is earlier than the third period.

A communication process of Example 4 in FIG. 3 is as follows.

Step 301: The first device sends a first message to the second device, and correspondingly, the second device receives the first message from the first device. The second device sends the first message to the third device.

Similar to Step 201 in FIG. 2*a*, when the first device is a terminal device, the terminal device may be in a connected state (CONNECTED), an active state (ACTIVE), an inactive state (INACTIVE), an idle state (IDLE), or the like. This is not limited.

The first message sent by the first device to the second device may be data information, or may be various kinds of request information, or the like. The data may be, for example, application layer data, user plane (user plane, UP) data, or control plane (control plane, CP) data (for example, an identifier ID of the first device). The request may be a network access request (for example, a sequence).

The first device may send the first message to the second device on a first resource. The first resource includes one or more of the following resources: a time domain resource, a frequency domain resource, and a code domain resource. The first resource and a transmission parameter (for example, an MCS) that are used by the first device to send the first message to the second device may be configured by the second device for the first device, or may be configured by the third device for the first device. The first resource may be a grant-free resource, or may be a dynamic scheduling-based resource.

Optionally, the first device may send the first message to the second device in the second period (the member sending period). The second period is pre-configured, and the second period is used by the first device to send the first message to the second device.

The second period may be pre-configured by the second device or the third device. In this case, the first device may receive, from the second device or the third device, a message used to configure the second period. For example, the third device may configure the second period for the first device using RRC signaling, a MAC CE, or DCI. For another example, the second device may configure the second period for the first device using RRC signaling, a MAC CE, DCI, or SCI.

When the first device sends the first message to the second device, another device may send a message to the second device.

The second device may send the first message from the first device to the third device. Optionally, the second device may pack the first message from the first device and the message from the another device, and send the packed message to the third device. Optionally, the second device may not pack the first message with another message, but separately send the first message to the third device.

Step 302: The first device may listen to a response message of the first message from the third device in the first period (the base station response period). The first period is pre-configured, and the first period is used by the first device to listen to the response message of the first message from the third device. One or more first periods may be pre-configured. The first period used to listen to the response message herein may be the first period after the first message is sent. The response message of the first message may be sent by the third device to the first device, or may be sent by the third device to the first device via the second device.

The first period (the base station response period) may be pre-configured by the second device or the third device. In this case, the first device may receive, from the second device or the third device, a message used to configure the first period. For example, the third device may configure the first period for the first device using RRC signaling, a MAC CE, or DCI. For another example, the second device may configure the first period for the first device using RRC signaling, a MAC CE, DCI, or SCI.

In an example, the first device may listen to the response message in each first period after sending the first message. In another example, there is an association relationship between the second period (the member sending period) and the first period (the base station response period). To be specific, the first device can determine a corresponding first period (a base station response period) based on a second period (a member sending period) when sending the first message, to listen to the response message in the determined first period (the base station response period). In another example, there is an association relationship between the member sending period (the second period), the cluster head acknowledgment period (the third period), or the base station response period (the first period). To be specific, the first device can determine a corresponding cluster head acknowledgment period (a third period) based on a member sending period (a second period) for sending the first message, and then determine a corresponding base station response period (a first period) based on the cluster head acknowledgment period (the third period), to listen to the response message in the determined first period.

Similar to Step 202 in FIG. 2*a*, the response message of the first message may be sent by the third device to the first device, or may be sent by the third device to the first device via the second device. After receiving the first message sent by the first device, the second device forwards the first message to the third device. The third device feeds back the response message to the first device only after receiving the first message forwarded by the second device.

There are two manners in which the first device directly listens to the response message sent by the third device. In one manner, the first device listens to downlink control information (downlink control information, DCI) sent by the third device, and then receives the response message based on an indication of the DCI. The DCI is carried on a physical downlink control channel (physical downlink control channel, PDCCH), the response message is carried on a physical downlink shared channel (physical downlink shared channel, PDSCH), and transmission of a PDSCH is scheduled by the DCI carried on the PDCCH. In the other manner, the first device receives transmission of a PDSCH on one or more pre-configured time-frequency resources, where the PDSCH carries the response message.

There are also two manners in which the first device listens to the response message sent by the second device, that is, the response message is sent by the third device to the first device via forwarding of the second device. In one manner, the first device listens to scheduling information (for example, DCI or sidelink control information SCI in a sidelink (sidelink)) sent by the second device. The scheduling information is for scheduling transmission of a data channel (for example, a PDSCH or a physical sidelink shared channel PSSCH), and the data channel carries the response message. In the other manner, the first device receives transmission of a data channel on one or more pre-configured time-frequency resources, and the data channel carries the response message.

The response message of the first message may include one or more of the following information: a contention resolution identity (contention resolution identity), an identifier of the first device (for example, a radio network temporary identifier (radio network temporary identity, RNTI) or an identifier of the first device in a cluster), a synchronization parameter (for example, a timing advance (time advance, TA)), a radio resource control RRC message (for example, resource allocation information), security information (for example, a key used by the first device to send a message next time), and the like.

In Embodiment 4, the first period used to listen to the response message is pre-configured. The first device listens to the response message only in the first period, and does not listen to the response message before the first period arrives or at a time point other than the first period. In this manner of pre-configuring the period used to listen to the response, the first device does not perform listening too early. Therefore, power consumption of the first device is reduced.

Next, another specific Example 5 is described with reference to FIG. 3. In Example 5, after receiving a first message sent by the first device, the second device may send indication information to the first device, to indicate that the first device may listen to a response message of the first message. After receiving the indication information, the first device listens to the response message of the first message in a first period. A detailed process is as follows.

Step 41: The first device sends the first message to the second device, and correspondingly, the second device receives the first message from the first device. The second device sends the first message to the third device. Step 41 is the same as Step 301. Details are not repeated.

Step 42: The second device sends a second message to the first device, and correspondingly, the first device may receive the second message from the second device, where the second message may include a first indication. The first indication may indicate the first device to listen to the response message of the first message from the third device in the first period. Refer to indication information in the cluster head acknowledgment period in FIG. 3.

The first indication may include but is not limited to one or more of the following: ACK acknowledgment information, indication information of one or more first periods, and information indicating whether to perform listening.

The ACK acknowledgment information may indicate that the second device receives the first message sent by the first device. In this case, the first device may listen to the response message of the first message from the third device in the first period.

If a member sending period or a cluster head acknowledgment period is associated with a plurality of base station response periods, the first indication may further indicate one or more base station response periods during which the first device listens to the response message. To be specific, the indication information of the one or more first periods may indicate the first device to listen to the response message of the first message from the third device in the first period in the one or more first periods. In this case, the first device listens to the response message in the one or more first periods indicated by the second device.

The information indicating whether to perform listening may occupy one or more bits. When the one or more bits indicate to perform listening, the first device listens to the response message of the first message from the third device in the first period. When the one or more bits indicate to not perform listening, the first device does not listen to the response message of the first message from the third device in the first period, and the first device may continue to receive the first indication of the second device in a subsequent cluster head acknowledgment period.

Optionally, the second device may send, in a third period (the cluster head acknowledgment period), the second message including the first indication to the first device. Correspondingly, the first device receives, in the third period, the second message that is sent by the second device and that includes the first indication.

The third period (the cluster head acknowledgment period) may be configured by the second device or the third device, and the first device may receive, from the second device or the third device, a message used to configure the third period. For example, the third device may configure the third period for the first device using RRC signaling, a MAC CE, or DCI. The second device may configure the third period for the first device using RRC signaling, a MAC CE, DCI, or SCI.

When the first indication in the second message is the ACK acknowledgment information and/or the information indicating whether to perform listening, for example, the first device may listen to the response message in a next first period. In another example, there is an association relationship between the member sending period (a second period), the cluster head acknowledgment period (the third period), or the base station response period (a first period). To be specific, the first device can determine a corresponding cluster head acknowledgment period based on a member sending period for sending the first message, and listen to, in the corresponding cluster head acknowledgment period, the second message including the first indication. Then, a corresponding base station response period is determined based on the corresponding cluster head acknowledgment period, so that the first device listens to the response message in the determined first period (the base station response period).

Step 43: After receiving the first indication, the first device listens to the response message of the first message from the third device in the first period determined in Step 42. Step 43 is the same as Step 302. Details are not repeated.

The first device does not listen to the response message beyond the base station response period. The first device listens to the response message in the base station response period only when receiving the first indication of the second device in the cluster head acknowledgment period.

Compared with the example in which the response message is listened to in the listening time window in FIG. 2*a*, in Example 5, because the cluster head acknowledgment period is set, the second device can centrally perform acknowledgment on the first message of the first device, for example, group-based acknowledgment. This reduces complexity of the second device.

Compared with Example 4 in FIG. 3, in Example 5, the first device determines, based on a receiving status of the first indication in the second message, whether to listen to the response message in the base station response period. In some conditions (when the second device indicates not to perform listening), invalid listening can be avoided, and power consumption can be further reduced.

In the example in FIG. 2*a*, specific Example 1, Example 2, and Example 3, and Example 4 and Example 5 in FIG. 3, the following process may be further performed.

The first device may further notify the second device of a priority of the first message in an explicit or implicit manner. The priority may include a plurality of types, for example, high, medium, and low. When the priority of the first message is high, the second device may forward the first message to the third device as early as possible, and the response message of the first message from the third device is also delivered earlier. In this case, when sending the second message to the first device to indicate the listening time window, the second device may indicate an earlier listening time window. For example, the second device indicates a smaller time domain offset. When the priority of the first message is low, the second device does not need to immediately forward the first message to the third device. For example, the first device may listen to the response message of the first message in the pre-configured first period.

A method for the first device to notify the second device of the priority of the first message may include but is not limited to the following several types.

Manner 1: The first device may further send priority indication information to the second device. Correspondingly, the second device receives the priority indication information from the first device, where the priority indication information indicates the priority of the first message.

Further, the second device may determine the priority of the first message based on the priority indication information, to determine time for sending the first message to the third device.

If the priority indication information indicates that the priority of the first message is high, the second device may send the first message to the third device as soon as possible. If the priority indication information indicates that the priority of the first message is low, the second device may not need to immediately send the first message to the third device. For example, the second device may wait for the message sent by the another device, and pack and send the message together with the first message to the third device.

The first message bears service-related information, and the priority indication information may alternatively indicate a priority of a service borne by the first message. Optionally, an association relationship between the service and the priority may be configured by the third device or the second device for the first device. The priority of the first message is explicitly indicated by using the indication information. The priority indication information may be carried in control information. The control information may be, for example, uplink control information (uplink control information, UCI) or SCI. The priority indication information may alternatively be carried in data, for example, carried in a MAC CE.

Manner 2: The first device may send the first message to the second device on the first resource. The first resource may indicate the priority of the first message. Corresponding, the second device receives the first message from the first device on the first resource. In other words, the first device may send the first message on the first resource corresponding to the priority of the first message, and the second device receives the first message on the first resource corresponding to the priority of the first message. When the first device sends a message by using different sending resources, the different sending resources correspond to different priorities. The priority is implicitly indicated by using the sending resource.

Further, the second device may determine the priority of the first message based on a priority corresponding to the first resource. If the priority corresponding to the first resource is high, the priority of the first message is high, and the second device may send the first message to the third device as soon as possible. If the priority corresponding to the first resource is low, the priority of the first message is low, and the second device may not need to immediately send the first message to the third device. For example, the second device may wait for the message sent by the another device, and pack and send the message together with the first message to the third device.

The first resource may include resources such as a time domain resource, a frequency domain resource, and a code domain resource. For example, when the first device sends the first message by using a first time domain resource, a first frequency domain resource, and a first code domain resource, it indicates that the priority of the first message is a high priority. When the first device sends the first message by using a second time domain resource, a second frequency domain resource, and a second code domain resource, it indicates that the priority of the first message is a low priority.

Optionally, when the priority of the first message is higher than or equal to a specified priority, or a priority identifier of the first message is the high priority, the first device may listen to the response message of the first message from the third device in the listening time window. It may also be understood that before the first device listens to the response message of the first message from the third device in the listening time window, the first device may first determine that the priority of the first message is higher than or equal to the specified priority, or the first device determines that the priority identifier of the first message is the high priority. That is, the first device listens to the response message of the first message in the listening time window only when the priority of the first message is high.

Optionally, when the priority of the first message is lower than or equal to the specified priority, or the priority identifier of the first message is the low priority, the first device may listen to the response message of the first message from the third device in the first period. It may also be understood that before the first device listens to the response message of the first message from the third device in the first period, the first device may first determine that the priority of the first message is lower than or equal to the specified priority, or the first device determines that the priority identifier of the first message is the low priority. That is, the first device listens to the response message of the first message in the first period only when the priority of the first message is low.

The following describes Example 6. The first device may determine, based on a priority of a first message, whether to listen to a response message based on indication information from the second device, or listen to a response message in a pre-configured first period (a base station response period).

Step 61: The first device sends the first message to the second device, and correspondingly, the second device receives the first message from the first device. The second device sends the first message to the third device. Specific details of Step 61 are similar to that of Step 201 in FIG. 2*a*. Details are not repeated.

For example, the first device may send the first message to the second device on a first resource. The first resource may indicate the priority of the first message. In other words, the first device may send the first message on the first resource corresponding to the priority of the first message.

For example, the first device may further send priority indication information to the second device, where the priority indication information indicates the priority of the first message.

Specific details of the priority of the first message have been described above. Details are not described herein again.

Step 62: The first device determines, based on the priority of the first message, whether to listen to the indication information from the second device before the first period (the base station response period) arrives. Correspondingly, the second device may determine, based on the priority of the first message, whether to send the indication information to the first device before the first period (the base station response period) arrives.

The indication information indicates information about a time window for listening to the response message. For example, in Step 62, the indication information from the second device may indicate a start point of a listening time window, for example, in a manner of indicating the start point of the listening time window in FIG. 2*a* and corresponding Example 1, Example 2, and Example 3. Details are not repeated. For example, in Step 62, the indication information from the second device may indicate the first device to listen to a response message of the first message from the third device in the first period. For example, in the manner of Example 4 and Example 5 in FIG. 3, the indication information may be one or more of the following: ACK acknowledgment information, indication information of one or more first periods, and information indicating whether to perform listening. Details are not repeated.

Step 63: When determining to listen to the indication information from the second device before the first period (the base station response period) arrives, the first device may listen to the indication information from the second device before the first period arrives. Correspondingly, when the second device determines to send the indication information to the first device before the first period (the base station response period) arrives, the second device may send the indication information to the first device before the first period arrives.

When the first device determines to listen to the indication information from the second device before the first period arrives, for example, the first device may listen to the indication information from the second device in a third period (a member sending period) or a second period (a cluster head acknowledgment period) before the first period arrives. Correspondingly, when the second device determines to send the indication information to the first device before the first period arrives, the second device may send the indication information to the first device in the third period or the second period before the first period arrives.

For example, the first device may first listen to the indication information from the second device in the third period (the member sending period). If the indication information from the second device is not detected in the third period (the member sending period), the first device may listen to the indication information from the second device in the second period (the cluster head acknowledgment period).

Step 64: When determining that it is not necessary to listen to the indication information from the second device before the first period (the base station response period) arrives, the first device may listen to the response message of the first message from the third device in the first period (the base station response period). Correspondingly, when the second device determines that it is not necessary to send the indication information to the first device before the first period (the base station response period) arrives, the second device may not send the indication information to the first device.

For example, if the priority of the first message is high (for example, greater than or equal to a specified priority, or a priority identifier of the first message is a high priority), the second device may send the indication information to the second device before the first period arrives, and the first device may listen to the indication information from the second device before the first period arrives. If the priority of the first message is low (for example, lower than or equal to the specified priority, or the priority identifier of the first message is a low priority), the second device may not send the indication information to the first device, and the first device may listen to the response message of the first message from the third device in the first period. The first period is pre-configured, and the first period is used by the first device to listen to the response message of the first message from the third device.

Specific details for the first device to listen to the response message of the first message from the third device in the listening time window are described in FIG. 2*a*, and corresponding Example 1, Example 2, and Example 3. Details are not repeated.

Specific details for the first device to listen to the response message of the first message from the third device in the pre-configured first period are described in the foregoing Example 4 and Example 5 in FIG. 3. Details are not repeated.

In Example 6, based on the priority of the first message, an occasion for listening to the response message of the first message is flexibly selected, so that efficiency of forwarding a message by the second device to the third device and a delay of sending a message by the first device can be balanced.

The foregoing describes the communication methods in embodiments of this application, and the following describes communication apparatuses in embodiments of this application. The method and the apparatus are based on a same technical idea. The method and the apparatus have similar principles for resolving problems. Therefore, for implementations of the apparatus and the method, refer to each other. Details are not repeated.

Figure 4:
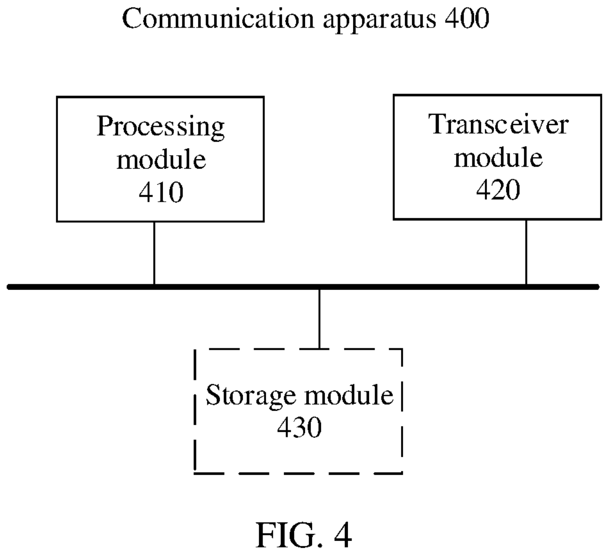
FIG. 4 is a diagram of a structure of a communication apparatus according to an embodiment of this application.

Based on a same technical idea as the foregoing communication method, as shown in FIG. 4, a communication apparatus 400 is provided. The apparatus 400 can perform steps performed by a first device, for example, perform steps performed by the first device in the methods in FIG. 2*a*, FIG. 3, and Example 1 to Example 6. The apparatus 400 may be the first device, or may be a chip used in the first device. The apparatus 400 may include a transceiver module 420 and a processing module 410. Optionally, the apparatus 400 further includes a storage module 430. The processing module 410 may be connected to both the storage module 430 and the transceiver module 420, and the storage module 430 may also be connected to the transceiver module 420.

In an example, the transceiver module 420 is configured to: send a first message to a second device, and start to listen to a response message of the first message from a third device at a start point of a listening time window.

In an example, the transceiver module 420 is further configured to receive a second message from the second device, where the second message indicates the start point. Alternatively, the processing module 410 is configured to determine the start point based on a first resource used to send the first message. Alternatively, the processing module 410 is configured to determine the start point based on a second resource associated with a first resource used by the first device to send the first message, and the second resource is used by the second device to send the first message to the third device.

In an example, the transceiver module 420 is further configured to receive an association relationship that is between the first resource and the second resource and that is configured by the second device or the third device.

In an example, when being configured to determine the start point based on the first resource used to send the first message, the processing module 410 is specifically configured to determine the start point based on a time domain offset and the first resource.

In an example, the transceiver module 420 is further configured to receive the time domain offset configured by the second device or the third device.

In an example, the transceiver module 420 is further configured to send priority indication information to the second device for the first device, where the priority indication information indicates a priority of the first message.

In an example, when being configured to send the first message to the second device, the transceiver module 420 is specifically configured to send the first message to the second device on the first resource corresponding to the priority of the first message. It may also be understood that the first resource indicates the priority of the first message.

In an example, when being configured to start to listen to the response message of the first message from the third device at the start point of listening, the transceiver module 420 is specifically configured to: when the priority of the first message is higher than or equal to a specified priority, or when the first device determines that a priority identifier of the first message is a high priority, the first device starts to listen to the response message of the first message from the third device at the start point of listening.

In an example, the storage module 430 may be configured to store information such as the time domain offset.

The storage module may include one or more memories. The memory may be a component configured to store a program or data in one or more devices or circuits. The storage module may store computer-executable instructions, so that the processing module performs the method in the foregoing embodiments. The storage module may be a register, a cache, a RAM, or the like. The storage module may be integrated with the processing module. The storage module may be a ROM or another type of static storage device that can store static information and instructions. The storage module may be independent of the processing module.

The transceiver module may be an input/output interface, a pin, a circuit, or the like.

The transceiver module 420 may alternatively be split into two functional modules, for example, a receiving module and a sending module. The receiving module is configured to perform a sending action of the transceiver module 420, and the receiving module is configured to perform a receiving action of the transceiver module 420.

Figure 5:
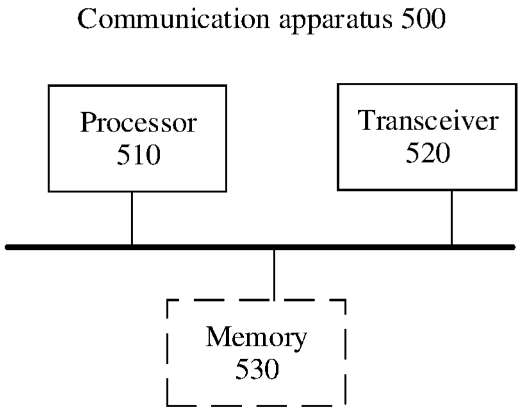
FIG. 5 is a diagram of a structure of a communication apparatus according to an embodiment of this application.

FIG. 5 is a schematic block diagram of a communication apparatus 500 according to an embodiment of this application. It should be understood that the apparatus 500 can perform the foregoing steps performed by a first device, for example, perform steps performed by the first device in the methods in FIG. 2*a*, FIG. 3, and Example 1 to Example 6. The apparatus 500 includes a processor 510 and a transceiver 520. Optionally, the apparatus 500 further includes a memory 530. The transceiver may be configured to receive program instructions and transmit the program instructions to the processor, or the transceiver may be configured to perform communication interaction between the apparatus and another communication device, for example, exchange control signaling and/or service data. The transceiver may be a code and/or data read/write transceiver, or the transceiver may be a signal transmission transceiver between a communication processor and a transceiver. The processor 510 and the memory 530 are electrically coupled.

For example, the memory 530 is configured to store a computer program. The processor 510 may be configured to invoke the computer program or instructions stored in the memory, to perform the foregoing communication method, or perform the foregoing communication method by using the transceiver 520.

In FIG. 4, the processing module 410 may be implemented by using the processor 510, the transceiver module 420 may be implemented by using the transceiver 520, and the storage module 430 may be implemented by using the memory 530.

In an example, the transceiver 520 is configured to: send a first message to a second device, and start to listen to a response message of the first message from a third device at a start point of a listening time window.

In an example, the transceiver 520 is further configured to receive a second message from the second device, where the second message indicates the start point. Alternatively, the processor 510 is configured to determine the start point based on a first resource used to send the first message; or the processor 510 is configured to determine the start point based on a second resource associated with a first resource used by the first device to send the first message, and the second resource is used by the second device to send the first message to the third device.

In an example, the transceiver 520 is further configured to receive an association relationship that is between the first resource and the second resource and that is configured by the second device or the third device.

In an example, when being configured to determine the start point based on the first resource used to send the first message, the processor 510 is specifically configured to determine the start point based on a time domain offset and the first resource.

In an example, the transceiver 520 is further configured to receive the time domain offset configured by the second device or the third device.

In an example, the transceiver 520 is further configured to send priority indication information to the second device for the first device, where the priority indication information indicates a priority of the first message.

In an example, when being configured to send the first message to the second device, the transceiver 520 is specifically configured to send the first message to the second device on the first resource corresponding to the priority of the first message. The first resource indicates the priority of the first message.

In an example, when being configured to start to listen to the response message of the first message from the third device at the start point of listening, the transceiver 520 is specifically configured to: when the priority of the first message is higher than or equal to a specified priority, or when the first device determines that a priority identifier of the first message is a high priority, the first device starts to listen to the response message of the first message from the third device at the start point of listening.

Figure 6:
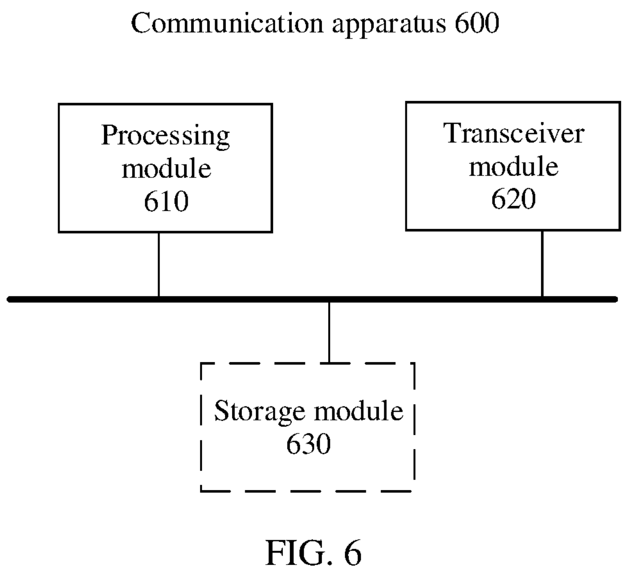
FIG. 6 is a diagram of a structure of a communication apparatus according to an embodiment of this application.

Based on a same technical idea as the foregoing communication method, as shown in FIG. 6, a communication apparatus 600 is provided. The apparatus 600 can perform the foregoing steps performed by a second device, for example, perform steps performed by the second device in the methods in FIG. 2*a*, FIG. 3, and Example 1 to Example 6. The apparatus 600 may be the second device, or may be a chip applied to the second device. The apparatus 600 may include a transceiver module 620 and a processing module 610. Optionally, the apparatus 600 further includes a storage module 630. The processing module 610 may be separately connected to the storage module 630 and the transceiver module 620, and the storage module 630 may be connected to the transceiver module 620.

In an example, the transceiver module 620 is configured to: receive a first message from a first device, send the first message to a third device, and send a second message to the first device. The second message indicates a start point of a listening time window, and the start point of the listening time window is used by the first device to listen to a response message of the first message from the third device.

In an example, the processing module 610 may be configured to determine a time domain offset for the first device or determine a priority of the first message or the like.

In an example, the storage module 630 is configured to store the first message.

The transceiver module 620 may alternatively be split into two functional modules, for example, a receiving module and a sending module. The receiving module is configured to perform a sending action of the transceiver module 620, and the receiving module is configured to perform a receiving action of the transceiver module 620.

Figure 7:
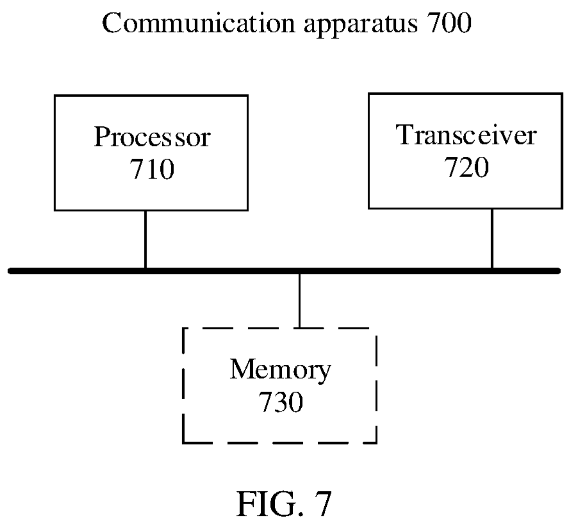
FIG. 7 is a diagram of a structure of a communication apparatus according to an embodiment of this application.

FIG. 7 is a schematic block diagram of a communication apparatus 700 according to an embodiment of this application. It should be understood that the apparatus 700 can perform the foregoing steps performed by a second device, for example, perform steps performed by the second device in the methods in FIG. 2*a*, FIG. 3, and Example 1 to Example 6. The apparatus 700 includes a processor 710 and a transceiver 720. Optionally, the apparatus 700 further includes a memory 730. The transceiver may be configured to receive program instructions and transmit the program instructions to the processor, or the transceiver may be configured to perform communication interaction between the apparatus and another communication device, for example, exchange control signaling and/or service data. The transceiver may be a code and/or data read/write transceiver, or the transceiver may be a signal transmission transceiver between a communication processor and a transceiver. The processor 710 and the memory 730 are electrically coupled.

For example, the memory 730 is configured to store a computer program. The processor 710 may be configured to invoke the computer program or instructions stored in the memory, to perform the foregoing communication method, or perform the foregoing communication method by using the transceiver 720.

In FIG. 6, the processing module 610 may be implemented by the processor 710, the transceiver module 620 may be implemented by the transceiver 720, and the storage module 630 may be implemented by the memory 730.

In an example, the transceiver 720 is configured to: receive a first message from a first device, send the first message to a third device, and send a second message to the first device. The second message indicates a start point of a listening time window, and the start point of the listening time window is used by the first device to listen to a response message of the first message from the third device.

In an example, the processor 710 may be configured to determine a time domain offset for the first device or determine a priority of the first message or the like.

The foregoing processor may be a central processing unit (central processing unit, CPU), a network processor (network processor, NP), or a combination of the CPU and the NP. The processor may further include a hardware chip or another general-purpose processor. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field programmable gate array (field programmable gate array, FPGA), a generic array logic (generic array logic, GAL) and another programmable logic device, a discrete gate or a transistor logic device, a discrete hardware component, or the like, or any combination thereof. The general-purpose processor may be a microprocessor, or the processor may be any conventional processor or the like.

It may be understood that the memory mentioned in embodiments of this application may be a volatile memory or a non-volatile memory, or may include a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM) that is used as an external cache. By way of example, and not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory described in this application is intended to include but is not limited to these memories and any memory of another proper type.

A transceiver apparatus, an interface circuit, or the transceiver in embodiments of this application may include a separate transmitter and/or a separate receiver, or the transmitter and the receiver may be integrated. The transceiver apparatus, the interface circuit, or the transceiver may work under an indication of a corresponding processor. Optionally, the transmitter may correspond to a transmitter machine in a physical device, and the receiver may correspond to a receiver machine in the physical device.

An embodiment of this application further provides a computer storage medium that stores a computer program. When the computer program is executed by a computer, the computer may be enabled to perform the foregoing communication method.

An embodiment of this application further provides a computer program product including instructions. When the computer program product runs on a computer, the computer is enabled to perform the communication methods provided above.

An embodiment of this application further provides a communication system. The communication system includes a first device and a second device that perform the foregoing communication methods. Optionally, the communication system may further include a third device.

An embodiment of this application further provides a communication system. The communication system includes a third device and a second device that perform the foregoing communication methods. Optionally, the communication system may further include a first device.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the methods, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of the another programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or the another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Although some preferred embodiments of this application have been described, a person skilled in the art can make changes and modifications to these embodiments once they learn the basic inventive concept. Therefore, the following claims are intended to be construed as to cover the preferred embodiments and all changes and modifications falling within the scope of this application.

Clearly, a person skilled in the art can make various modifications and variations to embodiments of this application without departing from the spirit and scope of embodiments of this application. In this way, this application is intended to cover these modifications and variations to embodiments of this application provided that they fall within the scope of protection defined by the following claims and their equivalent technologies of this application.

What is claimed is:

1. A communication method, wherein the method comprises:

sending, by a first device, a first message to a second device; and starting, by the first device, to listen to a response message directly from a third device at a start point of a listening time window, the response message responsive to the first message, the third device different from the first device and the second device, wherein the method further comprises:

determining, by the first device, the start point based on a second resource associated with a first resource used by the first device to send the first message, wherein the second resource is used by the second device to send the first message to the third device.

2. The method according to claim 1, further comprising:

receiving, by the first device, an association relationship that is between the first resource and the second resource and that is configured by the second device or the third device; and determining, by the first device, the second resource based on the association relationship.

3. The method according to claim 1, further comprising:

sending, by the first device, priority indication information to the second device, wherein the priority indication information indicates a priority of the first message.

4. The method according to claim 1, wherein the sending the first message comprises:

sending, by the first device, the first message to the second device on the first resource corresponding to a priority of the first message.

5. The method according to claim 1, wherein the starting to listen to the response message is performed in response to:

a priority of the first message being higher than or equal to a specified priority, or the first device determining that a priority identifier of the first message is a high priority.

6. A communication method, wherein the method comprises:

receiving, by a second device, a first message sent on a first resource from a first device;

forwarding, by the second device, the first message on a second resource to a third device different from the first device and the second device; and sending, by the second device indication information to the first device, wherein the second resource used by the second device to forward the first message to the third device is associated with the first resource used by the first device to send the first message, the indication information is usable by the first device to determine the second resource, based on which a start point of a listening time window is determinable by the first device, and the start point of the listening time window is a point at which the first device starts to listen to a response message of the first message from the third device.

7. A communication apparatus, wherein the apparatus comprises:

a transmitter, configured to send a first message to a second device;

a receiver, configured to start to listen to a response message of the first message from a third device at a start point of a listening time window; and a processor configured to determine the start point based on:

a second resource associated with a first resource used by the transmitter to send the first message to the second device, wherein the second resource is used by the second device to forward the first message to the third device which is different from the apparatus and the second device.

8. The apparatus according to claim 7, wherein the receiver is configured to listen to the response message directly from the third device, and the response message is responsive to the first message forwarded from the second device to the third device.

9. The apparatus according to claim 7, wherein the receiver is further configured to receive an association relationship that is between the first resource and the second resource and that is configured by the second device or the third device, and the processor is further configured to determine the second resource based on the association relationship.

10. The apparatus according to claim 7, wherein the transmitter is further configured to send priority indication information to the second device, wherein the priority indication information indicates a priority of the first message.

11. The apparatus according to claim 7, wherein the transmitter is configured to send the first message to the second device on the first resource corresponding to a priority of the first message.

12. The apparatus according to claim 7, wherein the receiver is configured to start to listen to the response message at the start point of the listening time window in response to:

a priority of the first message being higher than or equal to a specified priority, or the processor determining that a priority identifier of the first message is a high priority.

13. The method according to claim 1, wherein the first device does not listen to the response message between the sending the first message and the start point of the listening time window, and the response message is responsive to the first message forwarded from the second device to the third device.

14. The apparatus according to claim 7, wherein the receiver is configured to not listen to the response message after sending the first message to the second device and before the start point of the listening time window.

* * * * *